US008055097B2

(12) United States Patent
Inoue et al.

(10) Patent No.: US 8,055,097 B2
(45) Date of Patent: Nov. 8, 2011

(54) IMAGE PICK-UP APPARATUS, IMAGE PICK-UP PROGRAM, AND IMAGE PROCESSING PROGRAM

(75) Inventors: Katsuhiro Inoue, Utsunomiya (JP); Masanori Ishikawa, Saitama (JP); Jun Sugita, Sagamihara (JP); Mitsuru Shinohara, Hokuto (JP); Yuki Nagao, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 1101 days.

(21) Appl. No.: 11/478,288

(22) Filed: Jun. 28, 2006

(65) Prior Publication Data

US 2007/0019104 A1  Jan. 25, 2007

(30) Foreign Application Priority Data

Jun. 28, 2005 (JP) ................................. 2005-187883
Sep. 26, 2005 (JP) ................................. 2005-277406

(51) Int. Cl.
*G06K 9/36* (2006.01)
(52) U.S. Cl. ... 382/284; 382/128; 348/345; 348/208.99; 348/208.16
(58) Field of Classification Search .................. 382/284; 348/345, 208.99, 208.16; 395/55
See application file for complete search history.

(56) References Cited

U.S. PATENT DOCUMENTS

| | | | | | |
|---|---|---|---|---|---|
| 5,307,170 | A | * | 4/1994 | Itsumi et al. | 348/219.1 |
| 5,694,622 | A | * | 12/1997 | Miyamoto et al. | 396/48 |
| 5,839,002 | A | * | 11/1998 | Miyake et al. | 396/91 |
| 5,918,077 | A | * | 6/1999 | Wakabayashi et al. | 396/55 |
| 6,304,284 | B1 | * | 10/2001 | Dunton et al. | 348/36 |
| 6,392,696 | B1 | * | 5/2002 | Onuki | 348/208.99 |
| 6,628,898 | B2 | * | 9/2003 | Endo | 396/51 |
| 6,630,950 | B1 | * | 10/2003 | Ohkawara et al. | 348/208.12 |
| 7,184,091 | B2 | * | 2/2007 | Matsuda et al. | 348/369 |
| 7,295,232 | B2 | * | 11/2007 | Washisu | 348/239 |
| 7,423,671 | B2 | * | 9/2008 | Kiso | 348/218.1 |
| 7,446,810 | B2 | * | 11/2008 | Ono | 348/345 |
| 2002/0018136 | A1 | * | 2/2002 | Kaji et al. | 348/333.02 |
| 2004/0136580 | A1 | * | 7/2004 | Matsumiya et al. | 382/128 |
| 2004/0145673 | A1 | * | 7/2004 | Washisu | 348/364 |
| 2005/0253953 | A1 | * | 11/2005 | Ono | 348/345 |

FOREIGN PATENT DOCUMENTS

| | | | |
|---|---|---|---|
| JP | 10-312006 | | 11/1998 |
| JP | 11-101998 | * | 4/1999 |
| JP | 2000-069352 A | | 3/2000 |
| JP | 2004-191424 A | | 7/2004 |
| JP | 2004-202069 A | | 7/2004 |
| JP | 2004-221992 | * | 8/2004 |
| JP | 2004221992 A | * | 8/2004 |

* cited by examiner

*Primary Examiner* — Brian Q Le
*Assistant Examiner* — Mek Bekele
(74) *Attorney, Agent, or Firm* — Rossi, Kimms & McDowell LLP

(57) ABSTRACT

An image pick-up apparatus is disclosed which allows a reduction in degradation of images associated with a changed image magnification due to movements in a focus direction during image pick-up operation. The image pick-up apparatus has an image pick-up controller which performs a plurality of image pick-up operations for producing a single image and performs focus adjustment operation before each of the image pick-up operations to produce a first plurality of images, and an information producer which produces information on an image magnification of each of the first plurality of images. The image-pickup apparatus also has an image producer which produces a second plurality of images based on the first plurality of images and the information on the image magnification, and an image combiner which combines the second plurality of images to produce a single image.

7 Claims, 21 Drawing Sheets

| | |
|---|---|
| IMAGE FLUCTUATION CORRECTION EFFECT FOR THREE LEVELS | DIVISION INTO EIGHT TIME PERIODS |
| IMAGE FLUCTUATION CORRECTION EFFECT FOR TWO LEVELS | DIVISION INTO FOUR TIME PERIODS |
| IMAGE FLUCTUATION CORRECTION EFFECT FOR ONE LEVEL | DIVISION INTO TWO TIME PERIODS |

IMAGE PICK-UP APPARATUS, IMAGE PICK-UP PROGRAM, AND IMAGE PROCESSING PROGRAM

BACKGROUND OF THE INVENTION

The present invention relates to an image pick-up apparatus, an image pick-up program and an image processing program which produce a single combined image from a plurality of picked up images.

Movements of an image pick-up apparatus undesirable in image pick-up operation include not only ones in a direction perpendicular to an optical axis but also ones in a direction along the optical direction (hereinafter referred to as a focus direction). For the movements in the direction perpendicular to the optical axis, a number of techniques have been proposed which prevent fluctuations of an image by shifting part of an image pick-up lens unit in the direction perpendicular to the optical axis.

The movements produced in the focus direction during image pick-up operation result in a blurred image. Particularly when an image is picked up at a high magnification with a macro lens, the movements in the focus direction cause significant blurring in the image.

To address the problem, Japanese Patent Laid-Open No. H10(1998)-312006 has proposed a technique in which autofocus (AF) operation is first performed, and then, again performed during image pick-up operation, thereby preventing a blurred image due to movements in the focus direction during the image pick-up operation.

Although the technique proposed in Japanese Patent Laid-Open No. H10 (1998)-312006 can prevent a blurred image due to movements in the focus direction during the image pick-up operation, the AF operation during the image pick-up operation moves a focus lens to change an image pick-up magnification (an image magnification).

When a conventional image stabilizer is used to correct image fluctuations in the direction perpendicular to the optical axis, the shutter speed is lower than the value (1/f, where f represents a focal length) at which no image fluctuations generally occur from camera shake, so that the image magnification is greatly changed due to movements in the focus direction.

A change in the image magnification during image pick-up operation produces a displacement of the image, and particularly, significant displacements are seen in the peripheral portion of an image. If the image displacements remain within an allowable range for resolution, visually recognizable blurring is not produced. However, for example when images are picked up at a high magnification or at a low shutter speed with the image stabilizer, the image pick-up operation is susceptible to movements in the focus direction. In other words, the image magnification is greatly changed, which makes it difficult to realize appropriate resolution and deteriorates the image.

Next, data provided by actual measurements is used to calculate movements in the focus direction during image pick-up operation to show how much image deterioration occurs from the movements.

The actual measurement results show that the movement in the focus direction produced in an image pick-up time of 100 msec was 0.35 mm at most. Under image pick-up conditions such as life-size shots in which the image magnification is easily changed, the change rate of image magnification is ±0.44% from the calculation in the following expression (1):

$$M = \frac{f}{R \pm \Delta R} \quad (1)$$

where M represents the image magnification, f the focal length (80 mm), and R the object distance.

For example, when an image pick-up device such as a CCD sensor has a short side of 15.12 mm long and a long side of 22.68 mm long, the change rate of the image magnification shown above can be used to calculate an image displacement of approximately ±60 μm in the peripheral portion of the image as shown in FIG. 20. Since an allowable image displacement provided in a resolution chart is approximately ±15 μm in the image pick-up device, the image displacement of 60 μm cannot be analyzed and leads to visually recognizable blurring in the image.

FIG. 21 shows the relationship between the displacement in the peripheral portion of an image and the shutter speed for each image pick-up magnification. It can be seen from FIG. 21 that a higher image pick-up magnification causes a larger change in the image magnification and easily produces degradation of the image.

BRIEF SUMMARY OF THE INVENTION

It is an object of the present invention to provide an image pick-up apparatus, an image pick-up program, and an image processing program which allow a reduction in degradation of images associated with a changed image magnification due to movements in the focus direction during image pick-up operation.

According to one aspect, the present invention provides an image pick-up apparatus which has an image pick-up controller which performs a plurality of image pick-up operations for producing a single image and performs focus adjustment operation before each of the image pick-up operations to produce a first plurality of images, an information producer which produces information on an image magnification of each of the first plurality of images, an image producer which produces a second plurality of images based on the first plurality of images and the information on the image magnification, and an image combiner which combines the second plurality of images to produce a single image.

According to another aspect, the present invention provides an image pick-up apparatus which has an image pick-up controller which performs a plurality of image pick-up operations for producing a single image and performs focus adjustment operation before each of the image pick-up operations to produce a first plurality of images, and an information producer which produces information on an image magnification of each of the first plurality of images.

According to yet another aspect, the present invention provides an image pick-up program which has the steps of performing a plurality of image pick-up operations for producing a single image and performing focus adjustment operation before each of the image pick-up operations to produce a first plurality of images, producing information on an image magnification of each of the first plurality of images, producing a second plurality of images based on the first plurality of images and the information on the image magnification, and combining the second plurality of images to produce a single image.

According to a further aspect, the present invention provides an image pick-up program which has the steps of performing a plurality of image pick-up operations for producing a single image and performing focus adjustment operation before each of the image pick-up operations to produce a first plurality of images, and producing information on an image magnification of each of the first plurality of images.

According to a still further aspect, the present invention provides an image processing program which has a first step of capturing a first plurality of images and information on an image magnification of each of the first plurality of images, a second of producing a second plurality of images based on the first plurality of images and the information on the image magnification, and a third step of combining the second plurality of images to produce a single image.

Other objects and features of the present invention will become apparent from the following description and the attached drawings.

BRIEF DESCRIPTION OF THE DRAWINGS

FIG. 3 shows the relationship between the number of division of the total image pick-up time period and the effect of image fluctuation correction in Embodiment 1.

DETAILED DESCRIPTION OF THE PREFERRED EMBODIMENTS

Preferred embodiments of the present invention will hereinafter be described with reference to the drawings.

Embodiment 1

Figure 1:
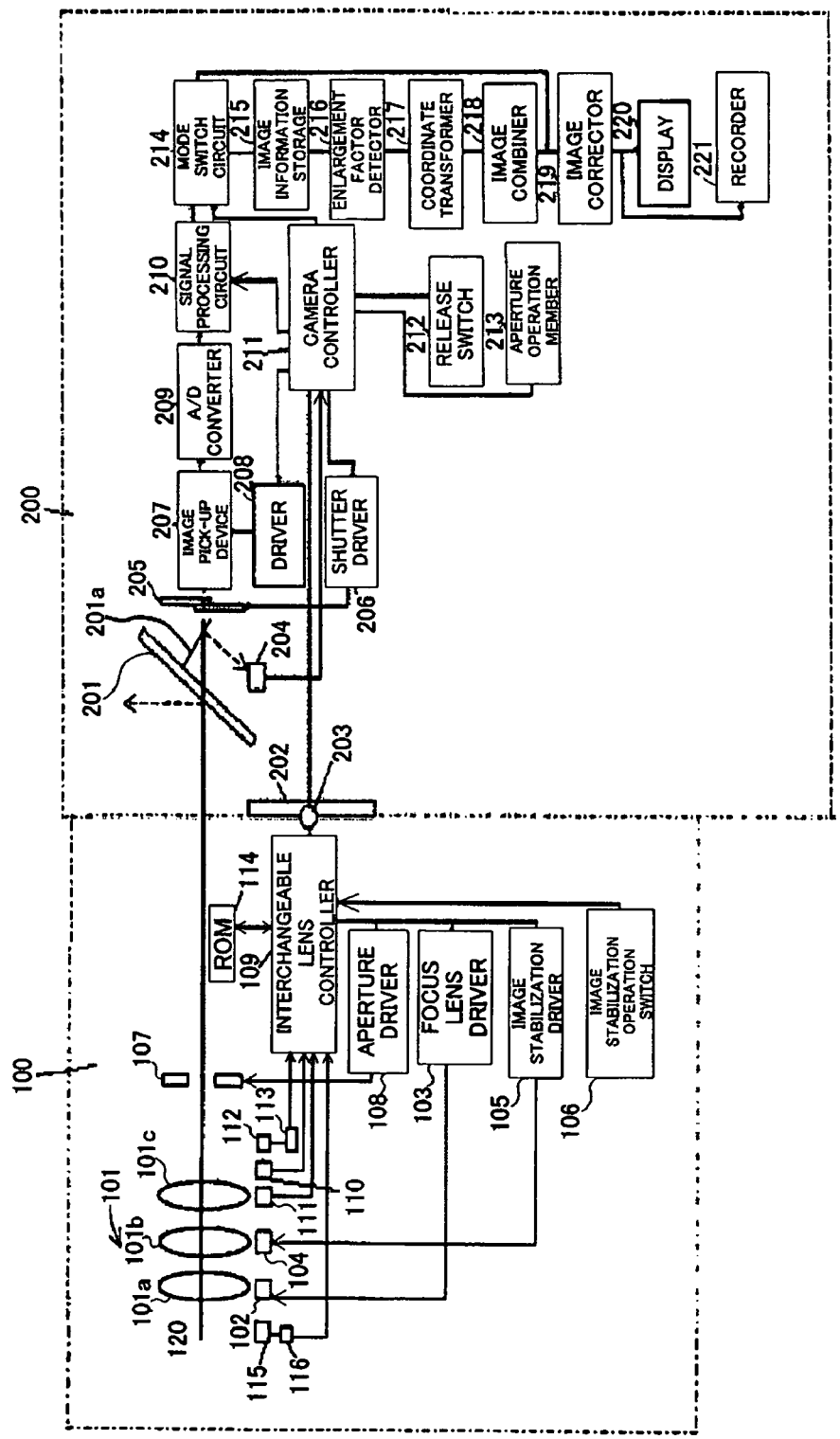
FIG. 1 is a block diagram schematically showing the structure of a single-lens reflex digital camera system which is Embodiment 1 of the present invention.

FIG. 1 schematically shows the structure of a camera system serving as an image pick-up system according to Embodiment 1 of the present invention. The camera system to be described is formed of an interchangeable lens which is provided with an image stabilizer for achieving optical image stabilization and a digital single-lens reflex camera (a camera body) serving as an image pick-up apparatus on which the interchangeable lens is removably mounted.

In FIG. 1, reference numeral 100 shows the interchangeable lens, 200 the camera body, 202 a mount which mechanically couples the interchangeable lens 100 to the camera body 200, and 203 a contact which enables electrical communication between the interchangeable lens 100 and the camera body 200.

The interchangeable lens 100 will be described first. The interchangeable lens 100 includes an image pick-up optical system 101 which is formed of a plurality of optical lens units. The image pick-up optical system 101 includes a focusing lens unit (hereinafter referred to simply as a focus lens) 101a which is movable in the direction of an optical axis to adjust focus. The image pick-up optical system 101 also has a shift lens unit (hereinafter referred to simply as a shift lens) 101b which is movable in a direction perpendicular to the optical axis to perform optical image stabilization, and a variable-magnification lens unit (hereinafter referred to simply as a variable-magnification lens) 101c which is movable in the optical axis direction to provide variable magnification.

While Embodiment 1 is described in conjunction with the case where the shift lens 101b is driven in the direction perpendicular to the optical axis direction to perform optical image stabilization, another optical element for optical image stabilization may be used instead of the shift lens 101b. For example, it is possible to use a variable angle prism which includes transparent liquid sealed between a pair of transparent plates and has an optical axis which can be shifted by tilting the transparent plates, or a lens which is rotated about one point on an optical axis.

For AF operation, the focus lens 101a is moved to an in-focus position in the direction of an optical axis 120 by driving force from an AF actuator 102. Specifically, the camera body 200 transmits a control signal to an interchangeable lens controller 109 including a CPU via the contact 203, and the interchangeable lens controller 109 transmits a driving signal based on the control signal to a focus lens driver 103. The focus lens driver 103 drives the AF actuator 102 based on the driving signal.

For optical image stabilization, the interchangeable lens controller 109 first receives an operation signal from an image stabilization operation switch 106 for activating an optical image stabilization function. The interchangeable lens 100 includes a movement detector 110. The movement detector 110 transmits a detection signal in response to movements of the camera to the interchangeable lens controller 109. The interchangeable lens controller 109 transmits a driving signal to an image stabilization driver 105. In response to the driving signal from the image stabilization driver 105, an image stabilization actuator 104 drives the shift lens 101b in the direction perpendicular to the optical axis to perform optical image stabilization. The shift lens 101b, the image stabilization actuator 104, and the image stabilization driver 105 constitute the image stabilizer.

Light-amount limiting operation is performed by driving an aperture 107. The aperture 107 has a plurality of aperture blades. When the camera body 200 transmits a control signal to the interchangeable lens controller 109 via the contact 203, the interchangeable lens controller 109 transmits a driving signal to an aperture driver 108. Upon reception of the driving signal, the aperture driver 108 actuates an aperture actuator, not shown, to drive the aperture blades. This changes the area of the opening of the aperture 107 through which light passes.

The interchangeable lens 100 has a displacement sensor 111 for detecting a displacement in the optical axis direction. The displacement sensor 111 detects a displacement in the optical axis direction (a displacement in the focus direction) of the camera system including interchangeable lens 100, the camera body 200, the mount 202, and the contact 203. The displacement sensor 111 is formed of an acceleration sensor, a velocity sensor, a position sensor, or the like. When the displacement sensor 111 is realized by an acceleration sensor, a known integration circuit can be used to integrate an output signal from the acceleration sensor twice to detect a displacement in the focus direction. When the displacement sensor 111 is formed of a velocity sensor, an output signal from the velocity sensor can be integrated once to detect a displacement in the focus direction.

In Embodiment 1, the displacement sensor 111 is provided for the interchangeable lens 100 and the output signal thereof is integrated in the interchangeable lens controller 109. Alternatively, the displacement sensor 111 may be provided for the camera body 200 and the integration may be performed in a camera controller 211 including a CPU.

The interchangeable lens 100 also has a focus pattern 115 serving as a conductive member for detecting a focus area and a signal generator 116 which slides on the focus pattern 115 to generate a pattern signal indicating a focus area from a patterned scale for respective focus areas. In addition, the interchangeable lens 100 has an ROM 114 which has optical information written thereon in association with the pattern signal indicating each focus area. The pattern signal from the signal generator 116 and the optical information from the ROM 114 are transmitted to the camera controller 211 via the interchangeable lens controller 109 and the contact 203, so that the camera controller 211 can obtain object distance information.

The interchangeable lens 100 also has a zoom pattern 112 serving as a conductive member for indicating a zoom area and a signal generator 113 which slides on the zoom pattern 112 to generate a pattern signal indicating a zoom area from a patterned scale for respective zoom areas. The above mentioned ROM 114 has optical information written thereon in association with the pattern signal indicating each zoom area. The pattern signal from the signal generator 113 and the optical information from the ROM 114 are transmitted to the camera controller 211 via the interchangeable lens controller 109 and the contact 203, so that the camera controller 211 can obtain focal length information. The ROM 114 may be contained in the interchangeable lens controller 109.

Next, the camera body 200 will be described. The camera body 200 has a shutter 205 which includes a plurality of shutter blades. The camera controller 211 in the camera body 200 transmits a control signal to a shutter driver 206 which then transmits a driving signal based on the control signal to the shutter 205. This causes the shutter blades to open or close the opening through which light passes, thereby controlling an amount of light (an exposure) entering an image pick-up device 207.

The camera body 200 has a release switch 212. When the camera controller 211 detects a half press of the release switch 212 (an SW1 is ON), the camera controller 211 outputs a control signal to start preparatory operation for picking up an image (including AF operation and photometric operation). When the camera controller 211 detects a full press of the release switch (an SW2 is ON), the camera controller 211 outputs a control signal to start image pick-up operation.

The camera body 200 also has an aperture operation member 213. When the camera controller 211 detects an operation of the aperture operation member 213, the camera controller 211 transmits a control signal to the interchangeable lens controller 109. The interchangeable lens controller 109 drives the aperture 107 in the interchangeable lens 100. This achieves the light-amount limiting operation.

The camera body 200 also has a quick return mirror 201. The quick return mirror 201 is movable to an observation position in which it is disposed in an image pick-up optical path including the optical axis 120 to direct light from the image pick-up optical system 101 to a view finder optical system, not shown, and to an image pick-up position in which it is retracted from the image pick-up optical path. A sub mirror 201a is disposed at the back of the quick return mirror 201 placed in the observation position. Part of the quick return mirror 201 is formed of half mirror, and light transmitted through the half mirror is then directed by the sub mirror 210a toward a focus detector 204. The focus detector 204 produces and outputs a signal in accordance with the focus state of the image pick-up optical system 101 with the phase difference detection method.

The camera controller 211 calculates a driving amount and a driving direction of the focus lens 101a necessary for achieving focus based on the signal from the focus detector 204, and transmits a control signal including the calculated information to the interchangeable lens controller 109. Upon reception of the control signal, the interchangeable lens controller 109 transmits a control signal to the focus lens driver 103 to drive the focus lens 101a to perform AF operation.

The image pick-up device 207 is formed of a solid-state image pick-up device such as a CMOS sensor and a CCD sensor. A driver 208 receives a control signal indicating a charge accumulation time and the like from the camera controller 211 and drives the image pick-up device 207.

An A/D converter 209 converts an analog image pick-up signal output from the image pick-up device 207 into a digital signal. A signal processing circuit 210 performs signal processing such as formation of a luminance signal and a color signal on the digital image pick-up signal input thereto from the A/D converter 209 to produce a color image signal.

A mode switch circuit 214 switches image pick-up modes in response to a control signal from the camera controller 211.

An image corrector 219 performs gamma correction and compression processing on the color image signal input there to via the modes witch circuit 214. The image corrector 219 outputs an image signal after the processing to a display 220 and a recorder 221. Thus, the picked up image is displayed in the display 220 and recorded on a recording medium such as a semiconductor memory and an optical disk loaded in the recorder 221.

Next, the image pick-up modes in Embodiment 1 will be described. When an image is picked up at a high magnification or at a low shutter speed with the image stabilizer, the image pick-up operation is susceptible to movements of the camera in the focus direction. The movements in the focus direction cause a change in the image magnification, which makes it difficult to realize appropriate resolution and deteriorates the image.

To address this, in Embodiment 1, an image pick-up time period (hereinafter referred to as a total image pick-up time period) necessary for providing correct exposure is divided into a plurality of shorter image pick-up time periods, image pick-up operation is repeated in the individual time periods to provide a plurality of images, and the plurality of images are combined into a single image. When the image pick-up time period is divided to perform the plurality of image pick-up operations in this manner, the image provided in each of the image pick-up operations is underexposed but is less affected by movements of the camera with reduced displacements. Thus, the plurality of images can be combined into the single image with reduced displacements at correct exposure. In the following, a mode in which such division image pick-up operations and combination of the images are performed will be referred to as a division image pick-up mode.

The camera controller 211 serving as an image pick-up control means selects the division image pick-up mode when it determines that an image is to be picked up at a high magnification or with the image stabilizer. Specifically, the camera controller 211 determines that an image is to be picked up at a high magnification when the object distance indicated by the pattern signal from the signal generator 116 based on the focus pattern 115 is equal to or lower than a predetermined value. The camera controller 211 can determine whether or not an image is to be picked up with the image stabilizer by an operation signal from the image stabilization operation switch 106 which is then transmitted to the camera controller 211 from the interchangeable lens controller 109 via the contact 203.

In the division image pick-up mode, the camera controller 211 determines the number of division of the total image pick-up time period based on the shutter speed and image pick-up magnification information. The image pick-up magnification is calculated from the object distance information and the focal length information as later described. The camera controller 221 performs AF operation prior to each image pick-up operation to provide images in sharp focus in all the image pick-up operations.

In the division image pick-up mode, after the SW1 is ON and focus adjustment operation is first performed with the signal from the focus detector 204, the image pick-up operation is repeated in response to each turn-on of the SW2 while the quick return mirror 201 and the sub mirror 201a are retracted. Thus, before the second and subsequent image pick-up operations, the AF operation cannot be performed with the output signal from the focus detector 204.

For this reason, in Embodiment 1, before the second and subsequent image pick-up operations, the output from the displacement sensor 111 is used to calculate a displacement amount and a displacement direction of the camera system in the focus direction, and based on that information, a driving amount and a driving direction of the focus lens 101a are calculated. The focus lens 101a is driven on the basis of the calculated information to perform the AF operation. Movements may occur in the focus direction during the time period from the ON of the SW2 to the first image pick-up operation. In Embodiment 1, after the SW2 is ON, the output from the displacement sensor 111 is also used to calculate a displacement amount and a displacement direction of the camera system in the focus direction, and the focus lens 101a is driven on the basis of the result to perform the AF operation.

Next, description will be made of how to determine the number of division of the image pick-up time period. It is generally said that the threshold of the shutter speed above which image fluctuations due to camera shake are produced is 1/80 seconds at a focal length of 80 mm, for example. If the shutter speed is lower than the threshold of the shutter speed above which the image fluctuations are produced, the image fluctuations affect the image pick-up operation to degrade the resulting image. Conventionally, an image stabilizer has been used to correct the image fluctuations in the direction perpendicular to the optical axis to reduce the image fluctuations due to camera shake.

When the shutter speed is increased or reduced by one level, the light amount is doubled or halved. In Embodiment 1, if the shutter speed is set to a value three levels lower than the threshold of the shutter speed above which image fluctuations are produced, and image fluctuations due to camera shake are corrected by the image stabilizer, that is referred to as the effect of image fluctuation correction for three levels.

In providing the effect of image fluctuation correction for three levels, the shutter speed is three levels lower than the threshold, and thus large image fluctuations occur in the focus direction to increase a change in the image magnification, thereby leading to a degraded image. To achieve simultaneously the effect of image fluctuation correction for three levels and the shutter speed set at the threshold above which image fluctuations are produced, the total image pick-up time period is divided into 8 ($2^3$). FIG. 3 shows the relation ship between the number of division and the effect of image fluctuation correction.

The respective images provided in the division image pick-up mode may vary slightly in the image pick-up magnification (the image magnification) due to focus fluctuations during the successive image pick-up operations even when they are not affected by camera shake in the focus direction. If the plurality of images with different image magnifications are superimposed one on another and combined into the single image, the combined image is blurred in accordance with the difference in the image magnification of the respective images before the combination. It is thus necessary to match the image magnifications of the plurality of images before the combination. In Embodiment 1, "matching the image magnifications" includes complete matching and certain mismatching in which image blur (image displacements) is inconspicuous to a viewer in the single image provided by combining the plurality of images. More specifically, "matching the image magnifications" includes the case where there is an image displacement (a shift of corresponding pixels) within an allowable range. The allowable range, which is allowed as resolvable, is a range of approximately 15 μm when pixels are arranged with a pitch of 6 μm, for example. This also applies to Embodiments 2 to 9.

Next, description will be made of the structure and the operation for producing a plurality of images having the matched image magnifications and combining the images into a single image.

In the division image pick-up mode, the camera controller 211 controls the mode switch circuit 214 to input an image signal (hereinafter referred to simply as an image) from the signal processing circuit 210 to an image information storage 215 via the mode switch circuit 214. In other words, the camera controller 211 disconnects the direct input of the image from the mode switch circuit 214 to the image corrector 219.

The image information storage 215 serving as an information producing means stores all of a plurality of images (a first plurality of images) sequentially transmitted thereto from the signal processing circuit 210 through a plurality of image pick-up operations in the division image pick-up mode, and calculates the image magnification of each of the plurality of images and stores them. The image magnification is calculated with the above mentioned expression (1).

The calculation of the image magnification with the expression (1) requires the focal length information and the object distance information. The focal length information can be calculated on the basis of the pattern signal transmitted via the interchangeable lens controller 109 from the signal generator 113 provided in association with the zoom pattern 112. The object distance information can be calculated on the basis of the pattern signal transmitted via the interchangeable lens controller 109 from the signal generator 116 provided in association with the focus pattern 115.

In Embodiment 1, the focal length information calculated at the time of the ON of the SW2 is used to calculate the image magnification of each of the images provided through the first to final image pick-up operations. This is because a user generally does not change the focal length of the image pick-up optical system 101 during a series of image pick-up operations. On the other hand, the object distance information in the first image pick-up operation is calculated by adding the object distance information calculated at the time of the ON of the SW2 to a displacement amount (a positive or negative value depending on the displacement direction) in the focus direction detected by the displacement sensor 111 during the time period from the ON of the SW2 to the first image pick-up operation.

To calculate the object distance information in the second and subsequent image pick-up operations, the object distance information in the image pick-up operation immediately before the current image pick-up operation is added to a displacement amount (a positive or negative value depending on the displacement direction) in the focus direction detected by the displacement sensor 111 during the time period from the previous to the current image pick-up operations.

The focal length information and the object distance information thus calculated can be used to calculate the image magnification of each image.

An enlargement factor detector 216 extracts a characteristic point in each image stored in the image information storage 215 and determines the position coordinates of the characteristic point in the image. For example, as shown in FIG. 5, a user attempts to take an image in which a man 501 is standing against a building 502 as a background in a frame (A). If movements of the camera occur in the focus direction in the subsequent image pick-up operation, the resulting image as shown in a frame (B) has a different image magnification from that in the frame (A) The frame (B) has an image magnification which is higher than that in the frame (A) and is the highest in the images provided through the plurality of image pick-up operations.

The enlargement factor detector 216 performs edge detection to extract as a characteristic point an edge 504 of a window 503, which is a point at high luminance, in the building 502 located in the peripheral portion of the screen in the frame (A). Next, the detector 216 compares the characteristic point 504 with a characteristic point 508 in the frame (B) having the highest image magnification to calculate a displacement (a motion vector or a scalar quantity) which represents the difference between them. Then, a coordinate transformer 217 serving as an image producing means performs coordinate transformation as enlargement processing such that the coordinates of the end points of the characteristic point 504 (A and B shown in the enlarged view (a) in FIG. 5) are matched to the coordinates of the points (C and D shown in the enlarged view (b) in FIG. 5) of the characteristic point 508 that correspond to those end points. In other words, the enlargement processing is performed by diffusion interpolation such that the area of the image of the frame (A) with the low image magnification that corresponds to the area of the image of the frame (B) with the highest image magnification is matched to the size of the latter area of the image of the frame (B). "Matching the size (or the same size)" includes not only complete matching but also certain mismatching which may be considered as matching without significant problems.

Next, the reason why the peripheral portion of the image pick-up screen is selected as the characteristic point will be described. In many images to be picked up, the main subject (object) is located near the center of the screen and is a human. If the main subject is selected as the characteristic point in this case, the main subject may move to affect the image pick-up operation. Specifically, in the plurality of image pick-up operations, the movements of the main subject are taken into the images as well as focus fluctuations due to movements of the hands of a user holding the camera, so that the above mentioned coordination transformation in the image is performed on the basis of the moving subject.

It seems that a favorable image is produced in this case since the coordinates are transformed to provide a proper image magnification of the human as the object. However, human movements are generally complex, and the detection accuracy greatly depends on the position selected as the characteristic point.

For example, if an eye of the subject (the human) is selected as the characteristic point, the blink of the eye may change the processing result. If a finger tip is selected as the characteristic point, a hand easily moves and causes fluctuations different from those of the entire main subject.

As described above, when the coordination transformation is performed in the image with a certain point of the human used as the characteristic point, the entire area including the human is not properly coordinate-transformed in many cases. In combining the plurality of images after the coordinate transformation, the coordinate positions vary from image to image, so that the combined image is not favorable.

A preferable image can be provided by selecting, as the characteristic point, the point on a stationary object such as a back ground to perform the coordinate transformation in the image as in Embodiment 1.

It is possible to select a plurality of characteristic points, not a single point, and calculate and use the average of motion vectors or the minimum value of scalar quantities of the plurality of characteristics points as the displacement amount of the characteristic points. The minimum value of scalar quantities is used as the displacement amount of the characteristic points because the selected characteristic points in the peripheral portion of the screen may move and thus the characteristic point with the smallest moving amount is selected.

Figure 4:
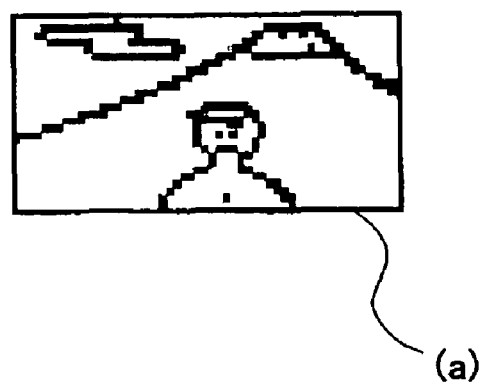
FIG. 4 shows an example of divided images picked up through respective image pick-up operations in a division image pick-up mode in Embodiment 1.
Figure 4:
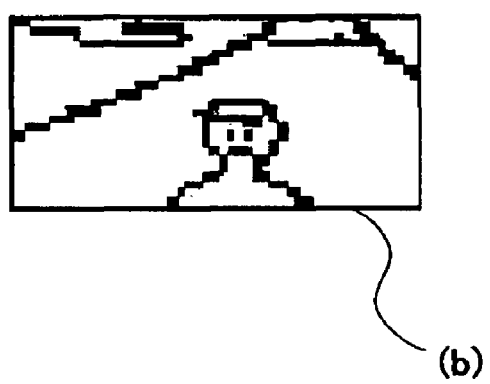
Figure 4:
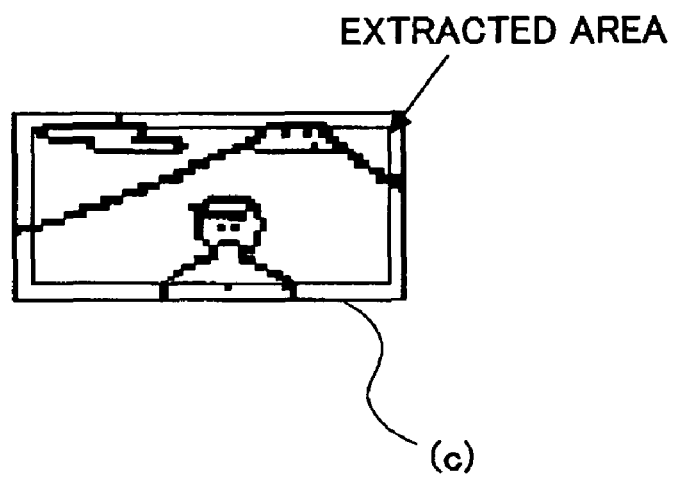
Figure 5A:
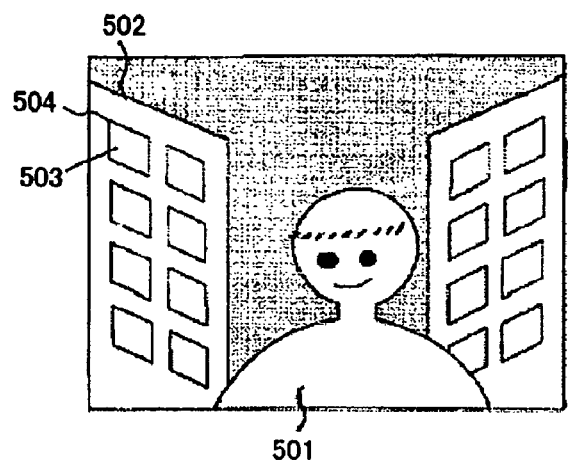
FIG. 5 shows an example of image magnification correction in Embodiment 1.
Figure 5B:
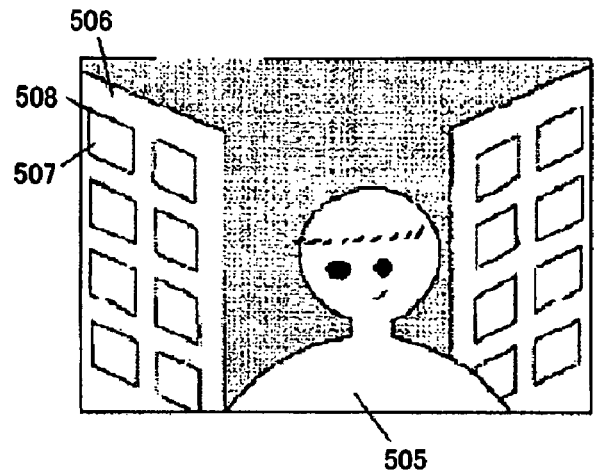
Figure 5A:
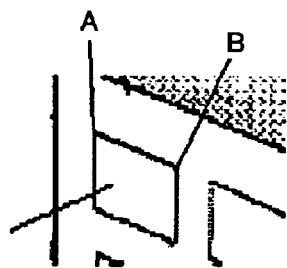
Figure 5B:
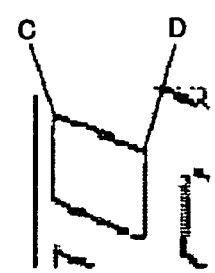

Next, description will be made of the reason why the image magnification is corrected such that the image magnification of each image is matched to that of the image with the highest image magnification. In FIG. 4, (a) shows the image with the lowest image magnification of the plurality of picked up images, (b) shows the image with the highest image magnification, and (c) shows the area of the image (a) that is seen in the image (b), that is, the area corresponding to the image (b). As apparent from the image (c), the image (a) includes in its peripheral portion an area that is not present in the image (b). That area cannot be created from the image (b). In the images other than the image with the highest image magnification, diffusion interpolation needs to be performed in the area included in (corresponding to) the image with the highest image magnification to achieve the enlargement to the size corresponding to the highest image magnification.

The enlargement factor detector 216 first determines which is the image with the highest image magnification of the plurality of obtained images. Specifically, since the image magnification is calculated and stored when each image is obtained (at the time of each image pick-up operation), it detects which is the image with the highest image magnification based on that information.

Next, the enlargement factor detector 216 compares the image with the highest image magnification (a first image) with another image (a second image) with a image magnification lower than that of the first image, and extracts characteristic points in the image with the highest image magnification and the other image (the second image) to calculate the position coordinates of the characteristic points in the image pick-up screen.

Then, the coordinate transformer 217 performs, as described above, the coordinate transformation (the enlargement processing) on each image with the image magnification lower than the highest to produce an image (a third image). The third images and the image with the highest image magnification are output to an image combiner 218 serving as an image combining means and combined thereby into a single image. In other words, the image combiner 218 combines a second plurality of images including the image with the highest image magnification and the images subjected to image magnification correction as the enlargement processing into the single combined image.

For digital images, even an underexposed image can be corrected for exposure by increasing the gain. However, an increase gain may result in an image with much noise.

In Embodiment 1 in which the plurality of images are combined into the single image with an increased gain, the noise of the respective images can be averaged to produce an image with a high S/N ratio. As a result, the noise can be reduced to provide correct exposure.

In other words, it can be said that the random noise is reduced by performing the plurality of image pick-up operations with high sensitivity in the image pick-up device 207 while noise is allowed, and then averaging the plurality of images provided through the plurality of image pick-up operations.

Figure 2:
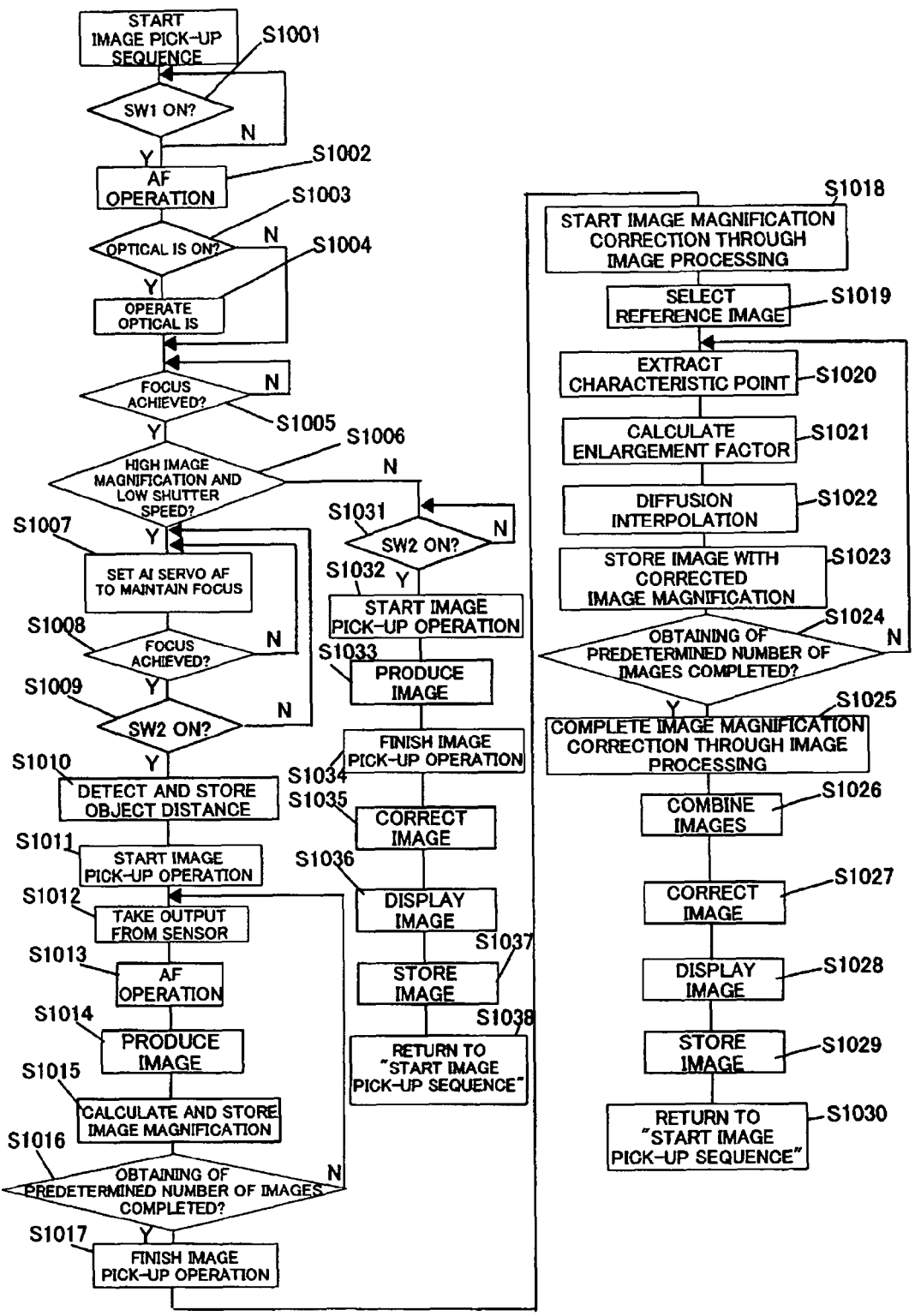
FIG. 2 is a flow chart showing the operation of the camera system of Embodiment 1.

FIG. 2 is a flow chart showing the details of the processing performed mainly by the camera controller 211 in Embodiment 1. The processing is performed by the camera controller 211 serving as a computer and executing a computer program shown in the flow chart. The processing starts when the power of the camera body 200 is turned on (ON).

At step (abbreviated as "s" in FIG. 2) 1001, the camera controller 211 waits for the release switch 212 to be half pressed to turn on the SW1. The flow proceeds to step 1002 when the SW1 is turned on. When the turn-on of the SW1 is not detected, the step 1001 is repeated until the SW1 is turned on.

At step 1002, AF operation is performed. Based on a signal from the focus detector 204, the camera controller 211 calculates a driving amount and a driving direction of the focus lens 101a for achieving focus and transmits a control signal including the information to the lens controller 109. The lens controller 109 drives the AF motor 102 based on the control signal to move the focus lens 101a in the optical axis direction.

At step 1003, it is determined whether or not the image stabilization operation switch 106 is on. When the image stabilization operation switch 106 is on, the flow proceeds to step 1004 to start image stabilization operation. When the image stabilization operation switch 106 is not on, the flow proceeds to step 1005.

At step 1005, it is determined whether or not the camera is in an in-focus state. If it is in the in-focus state, the flow proceeds to step 1006. If not, the operation at step 1005 is repeated until the in-focus state is achieved.

A step 1006, it is determined whether or not the image pick-up operation is performed at a high magnification based on the pattern signal from the focus pattern 115 (the signal generator 116) at the time of the in-focus state. It is also determined whether or not the image pick-up operation at a low shutter speed (that is, long exposure) is performed from the set shutter speed information. When the image pick-up operation is performed at the high magnification and the low shutter speed, the flow proceeds to step 1007 to perform processing in the division image pick-up mode. If the image pick-up operation is not performed at the high magnification, the flow proceeds to step 1031 to perform processing in a normal (ordinary) image pick-up mode. In the normal image pick-up mode, one AF operation and one image pick-up operation are performed to provide a single image.

At step 1007, the camera is set to an AF mode suitable for picking up a moving object, for example an AI servo AF mode, to maintain the focus even when fluctuations occur in the focus direction (the object distance is changed) during the plurality of image pick-up operations in the division image pick-up mode.

At step 1008, it is again determined whether or not focus is achieved. If focus is achieved, the flow proceeds to step 1009.

At step 1009, the camera controller 211 waits for the release switch 212 to be fully pressed to turn on the SW2. If the SW2 is turned on, the flow proceeds to step 1010. If the turn-on of the SW2 is not detected, the operations at step 1007 and step 1008 are repeated.

At step 1010, the object distance information at the time of the turn-on of the SW2 is calculated on the basis of the pattern signal from the focus pattern 115 and is stored in a memory, not shown. The focal length information at the time of the turn-on of the SW2 is also calculated on the basis of the pattern signal from the zoom pattern 112 (the signal generator 113) and is stored in a memory, not shown.

At step 1011, the quick return mirror 201 and the sub mirror 201a are retracted from the image pick-up optical path in order to start the image pick-up operation in the division image pick-up mode, that is, the plurality of image pick-up operations.

At step 1012, the output from the displacement sensor 111 is taken to detect a displacement (a displacement amount and a displacement direction) in the focus direction.

At step 1013, AF operation is performed on the basis of the output value from the displacement sensor 111 provided at step 1012. The reason why the AF operation is performed on the basis of the output from the displacement sensor 111 is described above.

At step 1014, an image is produced on the basis of the image pick-up signal output from the image pick-up device 207 through one of the plurality of image pick-up operations performed in the respective time periods provided by dividing the total image pick-up time period, and the image is stored in the image information storage 215.

At step 1015, the object distance information in the image pick-up operation performed at step 1014 is calculated. In the first image pick-up operation, the object distance information calculated at step 1010 is added to the displacement amount in the focus direction calculated on the basis of the output from the displacement sensor 111 at step 1012, and the sum is used as the object distance information at step 1015. In the second and subsequent image pick-up operations, the object distance information in the previous image pick-up operation is added to the displacement amount in the focus direction calculated at step 1012, and the sum is used as the object distance information. The image magnification is calculated from the calculated object distance information and the previously calculated focal length information, and is stored in the image information storage 215 in association with the image obtained at step 1014.

At step 1016, it is determined whether or not the obtaining of as many images as the number of division of the total image pick-up time period is completed in the current image pick-up operation. When it is completed, the flow proceeds to step 1017. When it is not completed, the operations from step 1012 to step 1015 are repeated until it is completed. After the obtaining of as many images as the number of division of the total image pick-up time period is completed, the flow proceeds to step 1017.

At step 1017, the image pick-up operation in the division image pick-up mode, that is, the plurality of image pick-up operations performed for producing the single image are finished.

At step 1018, image magnification correction is started through image processing.

First, at step 1019, the image magnifications of the respective images calculated at step 1015 are compared to select the image with the highest image magnification as a reference image which corresponds to the first image. The image magnification correction, later described, is not performed on the reference image with the highest image magnification. The image magnification correction is not performed on any of the other images that have the same image magnification as that of the reference image (not only the image having exactly the same image magnification but also the image having the image magnification which may be considered as the same). However, description will be made assuming that the images other than the reference image have image magnifications lower than that of the reference image.

At step 1020, a characteristic point is determined in each of the reference image and one of the other images serving as the second images.

At step 1021, an enlargement factor is calculated. By the factor, an area of the image compared with the reference image at step 1020 (hereinafter referred to as an image to be corrected) that is included in (corresponds to) the reference image can be enlarged (with coordinate transformation) to have the same image size as that of the reference image. Specifically, as described above, the enlargement factor is calculated on the basis of the displacement amount between the characteristic point of the reference image and the characteristic point of the image to be corrected.

At step 1022, diffusion interpolation is performed in accordance with the enlargement factor calculated at step 1021 to enlarge the area of the image to be corrected that corresponds to the reference image to have the same image size as that of the reference image.

At step 1023, the image enlarged at step 1022, that is, the image with the corrected image magnification (the third image, hereinafter referred to as an image with a corrected magnification) is stored in the image information storage 215.

At step 1024, it is determined whether or not the image magnification correction processing from step 1020 to step 1023 is completed for all the images other than the reference image. If completed, the flow proceeds to step 1025. If not completed, the processing from step 1020 to step 1023 is performed on the image which is not subjected to the image magnification correction.

At step 1025, the image magnification correction of the images other than the reference image through the image processing is finished.

At step 1026, the reference image and the other images with the corrected magnifications are superimposed and combined into a single image (hereinafter referred to as a combined image). If any image originally has the same image magnification as that of the reference image, that image is also combined. In this manner, the single combined image is produced at correct exposure.

At step 1027, the image corrector 219 performs the gamma correction and compression processing on the combined image.

At step 1028, the combined image output from the image corrector 219 is displayed in the display 220 as a picked up image.

At step 1029, the combined image output from the image corrector 219 is recorded on a recording medium through the recorder 221.

At step 1030, the flow returns to the start of image pick-up operation.

When the release switch 212 is still half pressed and the SW1 is ON at step 1030, the processing is performed from step 1002. When the release switch 212 is fully pressed and the SW2 is ON at step 1030, the flow does not return to the start of image pick-up operation and waits at step 1030.

When it is determined that the image pick-up operation is not performed at the high magnification at step 1006, the flow proceeds to step 1031 to start the operation in the normal image pick-up mode.

At step 1031, the camera controller 211 waits for the release switch 212 to be fully pressed to turn on the SW2. If the SW2 is turned on, the flow proceeds to step 1032. If the turn-on of the SW2 is not detected, the operation at step 1031 is repeated.

At step 1032, the image pick-up operation is started.

At step 1033, an image is produced on the basis of an image pick-up signal output from the image pick-up device 207 through the image pick-up operation.

At step 1034, the image pick-up operation is completed.

At step 1035, the image corrector 219 performs gamma correction and compression processing on the produced image.

At step 1036, the image output from the image corrector 219 is displayed in the display 220 as a picked up image.

At step 1037, the image output from the image corrector 219 is recorded on the recording medium through the recorder 221.

At step 1038, the flow returns to the start of image pick-up operation.

When the release switch 212 is still half pressed and the SW1 is ON at step 1038, the processing is performed from step 1002. When the release switch 212 is fully pressed and the SW2 is ON at step 1038, the flow does not return to the start of image pick-up operation and waits at step 1038.

As described above, according to the camera system of Embodiment 1, the plurality of images with the matched image magnifications are formed from the plurality of images picked up in the division image pick-up mode, and then the plurality of images are combined into the single image. It is thus possible to provide the combined image at correct exposure with high quality and almost no image displacements.

Embodiment 2

Figure 6:
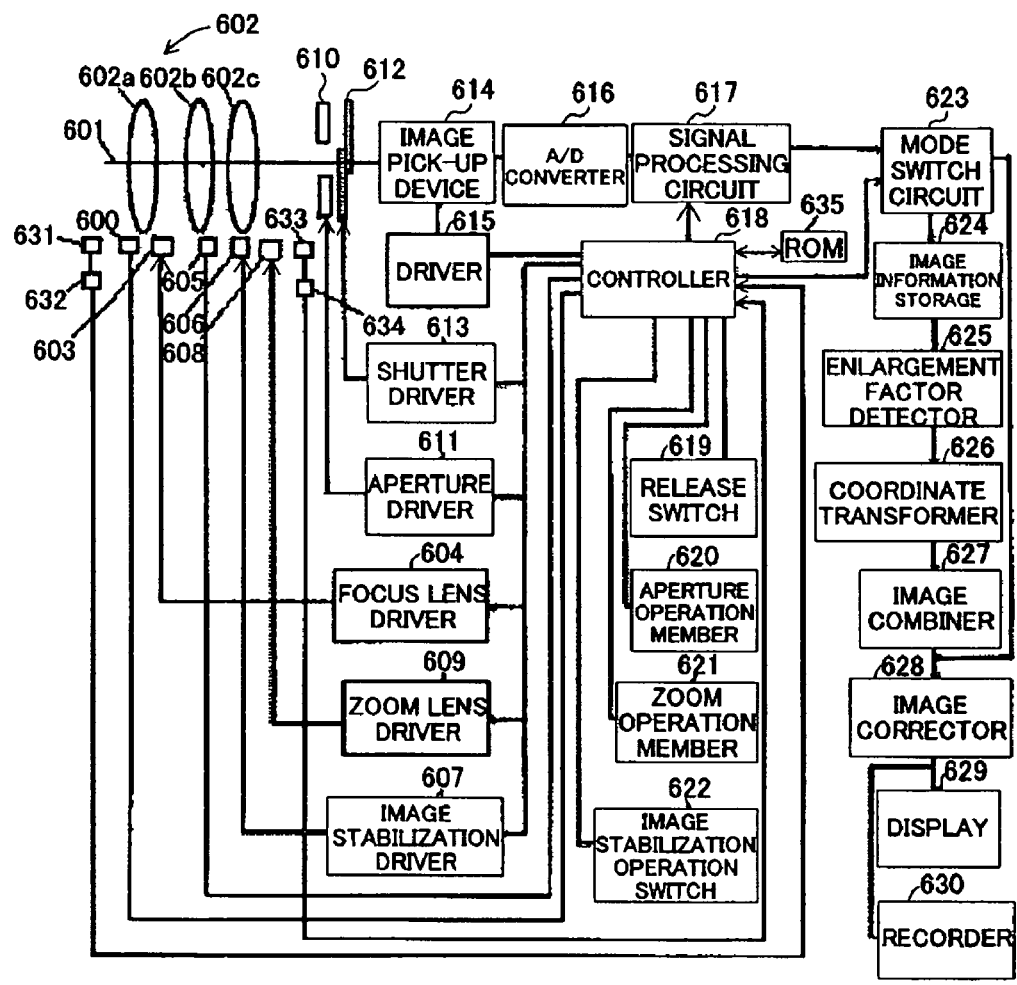
FIG. 6 is a block diagram schematically showing the structure of a compact digital camera which is Embodiment 2 of the present invention.

FIG. 6 schematically shows the structure of a camera according to Embodiment 2 of the present invention. Description will be made of an example of a compact digital camera integral with an image pick-up lens and including an image stabilizer.

The compact digital camera of Embodiment 2 does not include a quick return mirror or a sub mirror, and does not have a focus detector for performing focus detection by using light from the sub mirror, unlike the single-lens reflex camera described in Embodiment 1. Thus, AF operation is performed with the contrast detection method. Embodiment 2 also differs from Embodiment 1 in that Embodiment 2 provides variable magnification electrically. A controller 618 including a CPU performs control associated with the AF operation, variable magnification, and image pick-up operation.

Embodiment 2 will be described in conjunction with the AF operation in the contrast detection method. However, the AF operation is not limited to the contrast detection method when the present invention is applied to the compact digital camera, and for example, the AF operation may be performed by using an external-light passive AF sensor. Alternatively, the AF operation may be realized by a combination of the contrast detection method with another AF method. Any AF method can be used as long as focus detection is achieved with almost no delay.

In FIG. 6, the digital camera of Embodiment 2 has an image pick-up optical system 602 formed of a plurality of optical lens units. The image pick-up optical system 602 includes a focus lens unit (hereinafter referred to simply as a focus lens) 602a which is movable in an optical axis direction to adjust focus, a shift lens unit (hereinafter referred to simply as a shift lens) 602b which is movable in a direction perpendicular to the optical axis to perform optical image stabilization, and a variable-magnification lens unit (hereinafter referred to simply as a variable-magnification lens) 602c which is movable in the optical axis direction to provide variable magnification.

While Embodiment 2 is described in conjunction with the case where the shift lens 602b is driven in the direction perpendicular to the optical axis direction to perform optical image stabilization, another optical element for optical image stabilization may be used instead of the shift lens 602b. For example, it is possible to use a variable angle prism which includes transparent liquid sealed between a pair of transparent plates and has an optical axis which can be shifted by tilting the transparent plates, or a lens which is rotated about one point on the optical axis.

For AF operation, the controller 618 causes the focus lens 602a to move in the direction of the optical axis 601 over the entire movable range (scan driving) with driving force from an AF actuator 603. During the scan driving, the controller 618 stores in a memory, not shown, the position (the in-focus position) at which an AF evaluation signal is at the highest. The AF evaluation signal represents the high-frequency component of a video signal produced by processing an image pick-up signal from an image pick-up device 614. Then, the controller 618 moves the focus lens 602a to the in-focus position. However, in a division image pick-up mode, later described, the controller 618 drives the focus lens 602a such that it searches for the position corresponding to the highest value of the AF evaluation signal, as in AF operation with the contrast detection method in a video camera or the like. The controller 618 stops the focus lens 602a at the position (the in-focus position) at which the AF evaluation signal is determined as the highest.

For optical image stabilization, the controller 618 first receives an operation signal from an image stabilization operation switch 622 for activating an optical image stabilization function. The camera of Embodiment 2 includes a movement detector 600. The movement detector 600 transmits a detection signal in response to movements of the camera to the controller 618. The controller 618 transmits a driving signal to an image stabilization driver 607. In response the driving signal from the image stabilization driver 607, an image stabilization actuator 606 drives the shift lens 602b in the direction perpendicular to the optical axis to perform the optical image stabilization operation. The shift lens 602b, the image stabilization actuator 606, and the image stabilization drier 607 constitute the image stabilizer.

Light-amount limiting operation is performed by driving an aperture 610. The aperture 610 has a plurality of aperture blades. The controller 618 transmits a driving signal to an aperture driver 611. Upon reception of the driving signal, the aperture driver 611 operates an aperture actuator, not shown, to drive the aperture blades. This changes the area of the opening through which light passes.

The camera also has a focus pattern 631 serving as a conductive member for detecting a focus area and a signal generator 632 which slides on the focus pattern 631 to generate a pattern signal indicating a focus area from a patterned scale for respective focus areas. In addition, the camera has an ROM 635 which has optical information written thereon in association with the pattern signal indicating each focus area. The pattern signal from the signal generator 632 and the optical information from the ROM 635 are transmitted to the controller 618, so that the controller 618 can receive object distance information.

The camera also has a zoom pattern 633 serving as a conductive member for detecting a zoom area and a signal generator 634 which slides on the zoom pattern 633 to generate a pattern signal indicating a zoom area from a patterned scale for respective zoom areas. In addition, the above mentioned ROM 635 has optical information written thereon in association with the pattern signal indicating each zoom area. The pattern signal from the signal generator 634 and the optical information from the ROM 635 are transmitted to the controller 618, so that the controller 618 can receive focal length information. The ROM 635 may be contained in the controller 618.

The camera also has a shutter 612 which includes a plurality of shutter blades. The controller 618 transmits a control signal to a shutter driver 613. The shutter driver 613 then transmits a driving signal in accordance with the control signal to the shutter 612 to cause the shutter blades to open or close the opening through which light passes. This controls alight amount (an exposure) entering the image pick-up device 614.

The camera further has a release switch 619. When the controller 618 detects a half press of the release switch 619 (an SW1 is ON), the controller 618 outputs a control signal to start preparatory operation for picking up an image (including AF operation and photometric operation). When the controller 618 is notified of a full press of the release switch 619 (an SW2 us ON), the controller outputs a control signal to start image pick-up operation.

The camera also has an aperture operation member 620. When the controller detects operation of the aperture operation member 620, the controller 618 drives the aperture 610 via the aperture driver 611. This realizes the light-amount limiting operation.

The camera also has a zoom operation member 621. When the controller 618 detects operation of the zoom operation member 621, the controller 618 drives a zoom actuator 608 via a zoom lens driver 609. This drives the variable-magnification lens 602c in the optical axis direction to achieve variable magnification.

The image pick-up device 614 is formed of a solid-state image pick-up device such as a CMOS sensor and a CCD sensor. A driver 615 receives a control signal indicating a charge accumulation time and the like from the controller 618 and drives the image pick-up device 614.

An A/D converter 616 converts an analog image pick-up signal output from the image pick-up device 614 into a digital signal. A signal processing circuit 617 performs signal processing such as formation of a luminance signal and a color signal on the digital image pick-up signal input thereto from the A/D converter 616 to produce a color image signal.

A mode switch circuit 623 switches image pick-up modes in response to a control signal from the controller 618.

An image corrector 628 performs gamma correction and compression processing on the color image signal (a still image signal or a moving image signal) input thereto via the mode switch circuit 623. The image corrector 628 outputs an image signal after the processing to a display 629 and a recorder 630. Thus, the image of an object for observation or the picked up image is displayed in the display 629 and recorded on a recording medium such as a semiconductor memory and an optical disk loaded in the recorder 630.

In Embodiment 2, similarly to Embodiment 1, the total image pick-up time period necessary for providing correct exposure is divided into a plurality of shorter image pick-up time periods, image pick-up operation is repeated in the individual time periods to provide a plurality of images, and the plurality of images are combined into a single image. In other words, the division image pick-up mode is performed.

Similarly to Embodiment 1, the controller 618 selects the division image pick-up mode when an image is to be picked up at a high magnification or with the image stabilizer. Specifically, the controller 618 determines that an image is to be picked up at a high magnification when the object distance indicated by the pattern signal from the signal generator 632 based on the focus pattern 631 is equal to or lower than a predetermined value. The controller 618 can determine whether or not an image is to be picked up with the image stabilizer by an operation signal from the image stabilization operation switch 622 which is then transmitted to the controller 618.

In the division image pick-up mode, the controller 618 determines the number of division of the total image pick-up time period based on the shutter speed and image pick-up magnification information. The image pick-up magnification is calculated from the object distance information and the focal length information. The number of division of the total image pick-up time period is determined in the same manner as in Embodiment 1 (see FIG. 3).

The controller 618 performs AF operation prior to each image pick-up operation to provide images in sharp focus in all the image pick-up operations.

Next, description will be made of the structure and the operation for producing a plurality of images having matched image magnifications and combining the images into a single image.

In the division image pick-up mode, the controller 618 serving as an image pick-up control means controls the mode switch circuit 623 to input an image signal (hereinafter referred to simply as an image) from the signal processing circuit 617 to an image information storage 624 via the mode switch circuit 623. In other words, the controller 618 disconnects direct input of the image from the mode switch circuit 623 to the image corrector 628.

The image information storage 624 serving as an information producing means stores all of a plurality of images (a first plurality of images) sequentially transmitted thereto from the signal processing circuit 617 through a plurality of image pick-up operations in the division image pick-up mode, and calculates the image magnification of each of the plurality of images and stores them. The image magnification is calculated with the above mentioned expression (1). In Embodiment 2, the AF operation with the contrast detection method can be used to move the focus lens 602a to the in-focus position following a change in the object distance without a long delay. The object distance information for use in the calculation of the image magnification of each image provided through each image pick-up operation can be derived from the pattern signal from the focus pattern 631 (the signal generator 632).

An enlargement factor detector 625 first determines which is the image with the highest image magnification of the plurality of obtained images. Specifically, since the image magnification is calculated and stored when each image is obtained (at the time of each image pick-up operation), the detector 625 detects which is the image with the highest image magnification based on that information.

Next, the enlargement factor detector 625 extracts a characteristic point in each image stored in the image information storage 624 and determines the position coordinates of the characteristic point in the image. The characteristic point is selected in the same manner as in Embodiment 1.

A coordinate transformer 626 serving as an image producing means performs enlargement processing on the images (second images) other than the image with the highest image magnification in the same manner as in Embodiment 1.

An image combiner 627 serving as an image combining means superimposes a second plurality of images consisting of the image (a first image) with the highest image magnification and the images (third images) enlarged by the coordinate transformer 626, and combines them into a single combined image at correct exposure.

Figure 7:
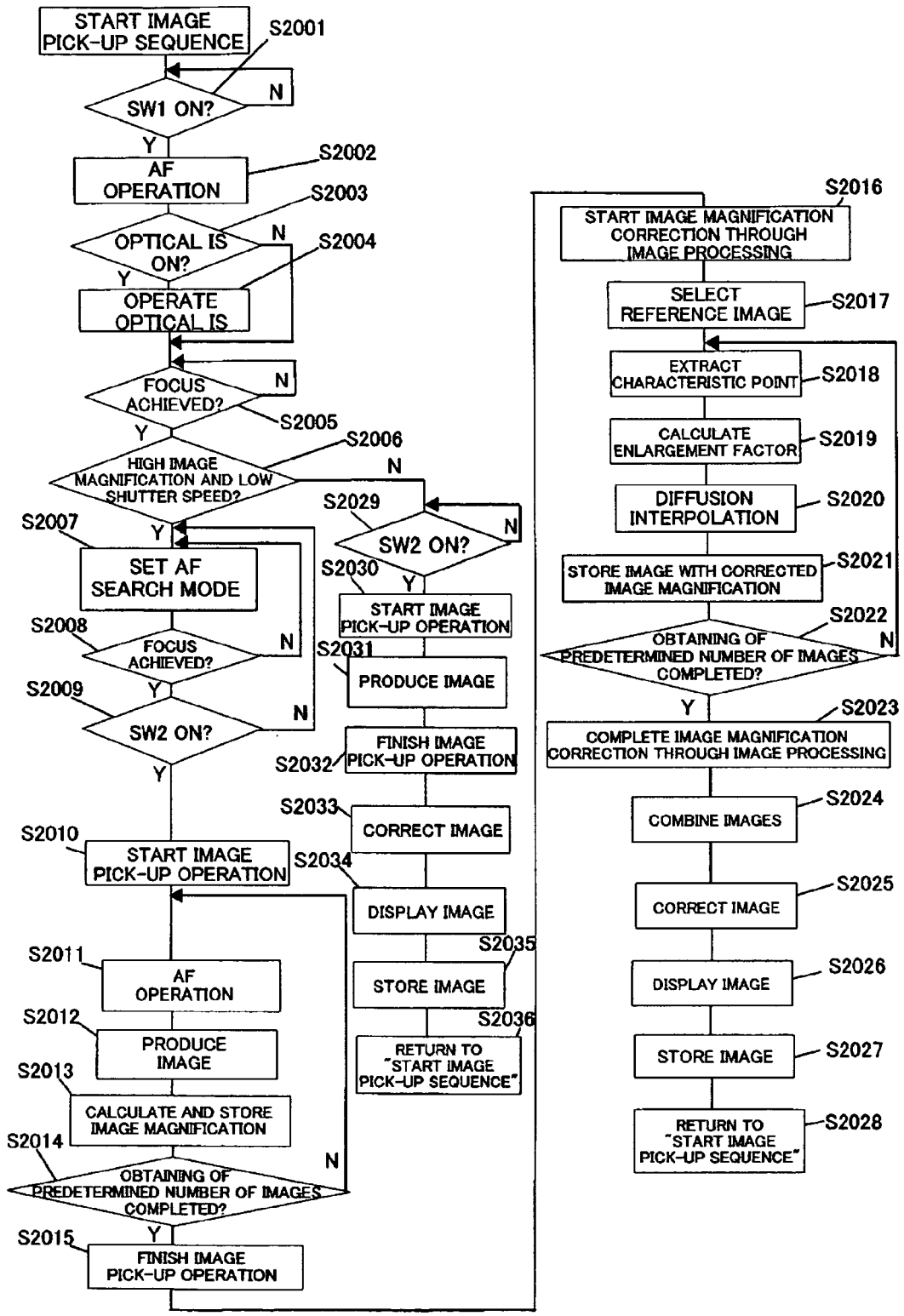
FIG. 7 is a flow chart showing the operation of the camera of Embodiment 2.

FIG. 7 is a flow chart showing the details of the processing performed mainly by the controller 618 in Embodiment 2. The processing is performed by the controller 618 serving as a computer and executing a computer program shown in the flow chart. The processing starts when the power of the camera body is turned on (ON).

At step 2001, the controller 618 waits for the release switch 619 to be half pressed to turn on the SW1. The flow proceeds to step 2002 when the SW1 is turned on. When the turn-on of the SW1 is not detected, the step 2001 is repeated until the SW1 is turned on.

At step 2002, AF operation is performed. The scan driving of the focus lens 602a is performed to locate the in-focus position with the contrast detection method. The focus lens 602a is driven to the in-focus position with the AF actuator 603.

At step 2003, it is determined whether or not the image stabilization operation switch 622 is on. When it is on, the flow proceeds to step 2004 to start the image stabilization operation. When it is not on, the flow proceeds to step 2005.

At step 2005, it is determined whether or not an in-focus state is achieved. If it is achieved, the flow proceeds to step 2006. If the in-focus state is not achieved, the operation at step 2005 is repeated until it is achieved.

At step 2006, it is determined whether or not the image pick-up operation is performed at a high magnification based on the pattern signal from the focus pattern 631 (the signal generator 632) at the time of the in-focus state. It is also determined whether or not the image pick-up operation at a low shutter speed (that is, long exposure) is performed at a low shutter speed based on the set shutter speed information. When the image pick-up operation is performed at the high magnification and the low shutter speed, the flow proceeds to step 2007 to perform the processing in the division image pick-up mode. When the image pick-up operation is not performed at the high magnification, the flow proceeds to step 2029 to perform the processing in a normal image pick-up mode. In the normal image pick-up mode, one AF operation and one image pick-up operation are performed to provide a single image.

At step 2007, the camera is switched to an in-focus position search mode with the contrast detection method to maintain the focus even when fluctuations occur in the focus direction (the object distance is changed) during a plurality of image pick-up operations in the division image pick-up mode.

At step 2008, it is again determined whether or not focus is achieved. If focus is achieved, the flow proceeds to step 2009.

At step 2009, the controller 618 waits for the release switch 619 to be fully operated to turn on the SW2. If the SW2 is turned on, the flow proceeds to step 2010. If the turn-on of the SW2 is not detected, the operations at step 2007 and step 2008 are repeated.

At step 2010, the controller 618 starts the image pick-up operation in the division image pick-up mode, that is, the plurality of image pick-up operations. The focal length information is calculated on the basis of the pattern signal from the zoom pattern 633 (the signal generator 634) and stored in a memory, not shown.

At step 2011, AF operation is performed in the search mode.

At step 2012, an image is produced on the basis of the image pick-up signal output from the image pick-up device 614 through one of the plurality of image pick-up operations performed in the respective time periods provided by dividing the total image pick-up time period, and the image is stored in the image information storage 624.

At step 2013, the object distance information in the image pick-up operation performed at step 2012 is calculated. The image magnification is calculated from the calculated object distance information and the previously calculated focal length information, and is stored in the image information storage 624 in association with the image produced at step 2012.

At step 2014, it is determined whether or not the obtaining of as many images as the number of division of the total image pick-up time period is completed in the current image pick-up operation. If it is completed, the flow proceeds to step 2015. If it is not completed, the operations from step 2011 to 2013 are repeated until it is completed. When the obtaining of as many images as the number of division of the total image pick-up time period is completed, the flow proceeds to step 2015.

At step 2015, the image pick-up operation in the division image pick-up mode, that is, the plurality of image pick-up operations performed for producing the single image are finished.

At step 2016, image magnification correction is started through image processing.

First, at step 2017, the image magnifications of the respective images calculated at step 2013 are compared to select the image with the highest image magnification as a reference image which is a first image. The image magnification correction, later described, is not performed on the reference image with the highest image magnification. The image magnification correction is not performed on any of the other images that have the same magnification as that of the reference image. However, description will be made assuming that the images other than the reference image have image magnifications lower than that of the reference image.

At step 2018, a characteristic point is determined in each of the reference image and one of the other images serving as the second images.

At step 2019, an enlargement factor is calculated. By the factor, an area of the image compared with the reference image at step 2017 (hereinafter referred to as an image to be corrected) that is included in (corresponds to) the reference image can be enlarged (with coordinate transformation) to have the same image size as that of the reference image. The enlargement factor is calculated in the same manner as in Embodiment 1.

At step 2020, diffusion interpolation is performed in accordance with the enlargement factor calculated at step 2019 to enlarge the area of the image to be corrected that corresponds to the reference image to have the same image size as that of the reference image.

At step 2021, the image enlarged at step 2020, that is, the image with the corrected image magnification (the third image, hereinafter referred to as an image with a corrected magnification) is stored in the image information storage 624.

At step 2022, it is determined whether or not the image magnification correction processing from step 2018 to step 2021 is completed for all the images other than the reference image. If completed, the flow proceeds to step 2023. If not completed, the processing from step 2018 to step 2021 is performed on the image which is not subjected to image magnification correction.

At step 2023, the image magnification correction of the images other than the reference image through the image processing is completed.

At step 2024, the reference image and the other images with the corrected image magnifications are superimposed and combined into a single image (hereinafter referred to as a combined image). If any image originally has the same image magnification as that of the reference image, that image is also combined. As described above, the single combined image is produced at correct exposure.

At step 2025, the image corrector 628 performs the gamma correction and compression processing on the combined image.

At step 2026, the combined image output from the image corrector 628 is displayed in the display 629 as a picked up image.

At step 2027, the combined image output from the image corrector 628 is recorded on a recording medium through the recorder 630.

At step 2028, the flow returns to the start of image pick-up operation.

When the release switch 619 is still half pressed and the SW1 is ON at step 2028, the processing is performed from step 2002. When the release switch 619 is fully pressed and the SW2 is ON at step 2028, the flow does not return to the start of image pick-up operation and waits at step 2028.

When it is determined that the image pick-up operation is not performed at the high magnification at step 2006, the flow proceeds to step 2029 to start the operation in the normal image pick-up mode.

At step 2029, the camera waits for the release switch 619 to be fully pressed to turn on the SW2. If the SW2 is turned on, the flow proceeds to step 2030. If the turn-on of the SW2 is not detected, the operation at step 2029 is repeated.

At step 2030, the image pick-up operation is started.

At step 2031, an image is produced on the basis of an image pick-up signal output from the image pick-up device 614 through the image pick-up operation.

At step 2032, the image pick-up operation is completed.

At step 2033, the image corrector 628 performs gamma correction and compression processing on the produced image.

At step 2034, the image output from the image corrector 628 is displayed as a picked up image in the display 629.

At step 2035, the image output from the image corrector 628 is recorded on the recording medium through the recorder 630.

At step 2036, the flow returns to the start of image pick-up operation.

When the release switch 619 is still half pressed and the SW1 is ON at step 2036, the processing is performed from step 2002. When the release switch 619 is fully pressed and the SW2 is ON at step 2036, the flow does not return to the start of image pick-up operation and waits at step 2036.

As described above, according to the camera of Embodiment 2, the plurality of images with the matched image magnifications are formed from the plurality of images picked up in the division image pick-up mode, and then the plurality of images are combined into the single image. It is thus possible to provide the combined image at correct exposure with high quality and almost no image displacements.

Embodiment 3

Figure 8:
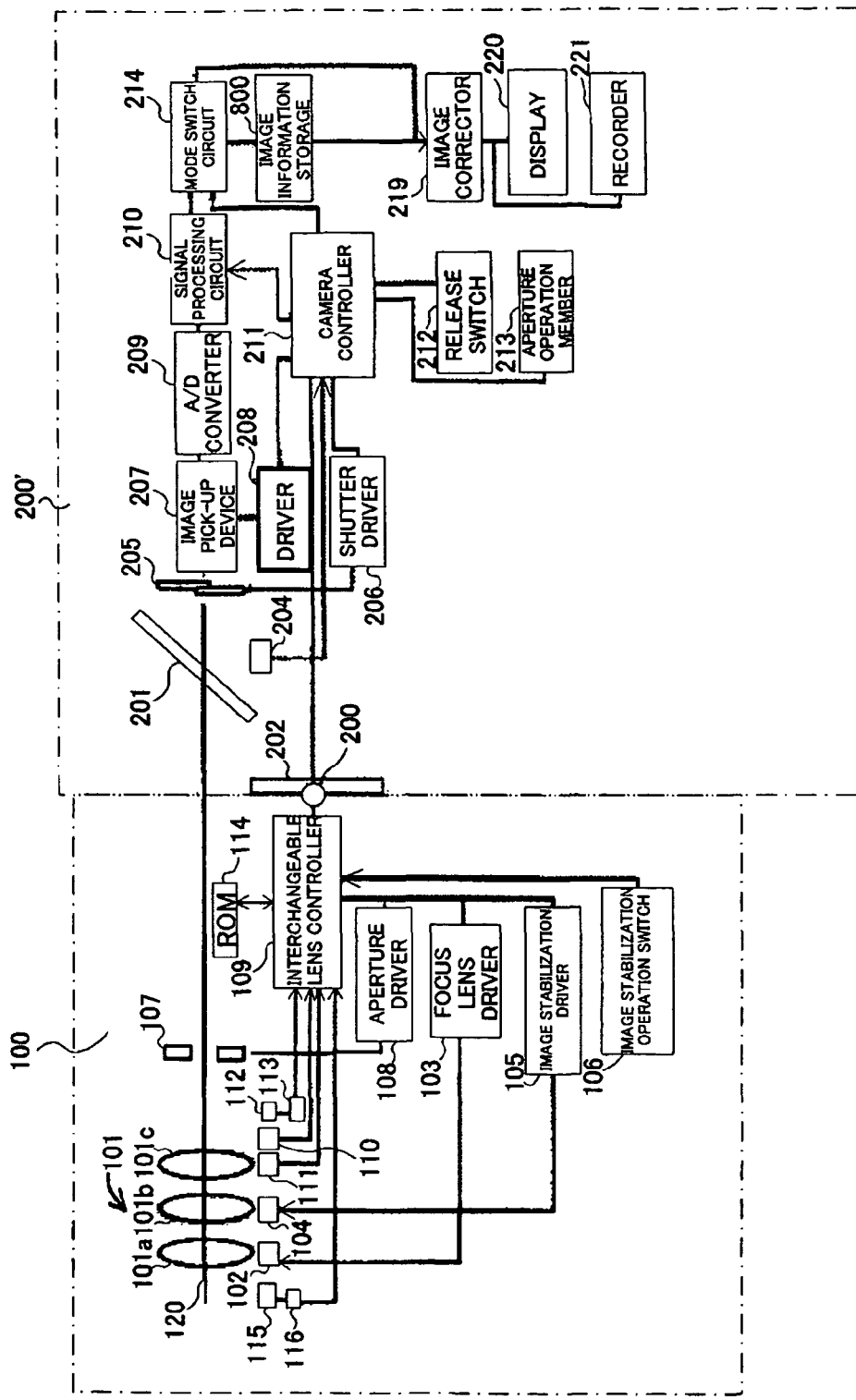
FIG. 8 is a block diagram schematically showing the structure of a single-lens reflex digital camera system which is Embodiment 3 of the present invention.

FIG. 8 schematically shows the structure of a single-lens reflex digital camera system which is an image pick-up system according to Embodiment 3 of the present invention. In Embodiment 1, the camera body has the function of calculating the image magnifications of the plurality of images provided in the division image pick-up mode and performing the image processing for matching the image magnifications (the image magnification correction processing), and then performing image combination processing to produce the single image. In contrast, a camera body 200' of Embodiment 3 has the function of picking up a plurality of images in a division image pick-up mode and calculating the image magnification of each of the images. The plurality of images and the image magnification information of each image are input to a personal computer 3000 shown in FIG. 9 which then performs image magnification correction processing and image combination processing. The image and the image magnification information can be transmitted to the personal computer 3000 from the camera body 200' through connection between the camera body 200' and the personal computer 3000 via a USB cable or through infrared communication.

An interchangeable lens 100 forming part of the single-lens reflex camera system shown in FIG. 8 is the same as that in Embodiment 1. In the camera body 200', components identical to those in Embodiment 1 are designated with the same reference numerals and the description thereof will be omitted.

Embodiment 3 basically corresponds to the camera body of Embodiment 1 from which the enlargement factor detector 216, the coordinate transformer 217, and the image combiner 218 are removed. However, the operation of an image information storage 800 is different from the counterpart in Embodiment 1.

The image information storage 800 stores all of a plurality of images (a first plurality of images) sequentially transmitted thereto from a signal processing circuit 210 through a plurality of image pick-up operations in a division image pick-up mode, and calculates the image magnification of each of the plurality of images and stores them. The image magnification is calculated in the same manner as in Embodiment 1. In addition, in Embodiment 3, the image information storage 800 stores, in association with each image obtained in the division image pick-up mode, a flag indicating that the image is a divided one and forms part of a single combined image, and information indicating the number of division of the total image pick-up time period. The function of the flag will be described.

An image corrector 219 performs gamma correction and compression processing on the image input thereto from the image information storage 800. The image after the processing is displayed in a display 220. The data including the image, the image magnification information, the flag, and the division number information as described above is recorded by a recorder 221 on a removable recording medium formed of a semiconductor memory or the like.

Since the image magnification correction processing and the image combination processing in Embodiment 3 are not performed in the camera body 200', the image displayed in the display 220 and the image recorded on the recording medium are underexposed ones.

While Embodiment 3 is described in conjunction with the single-lens reflex digital camera system, Embodiment 3 is applicable to a compact digital camera.

Figure 9:
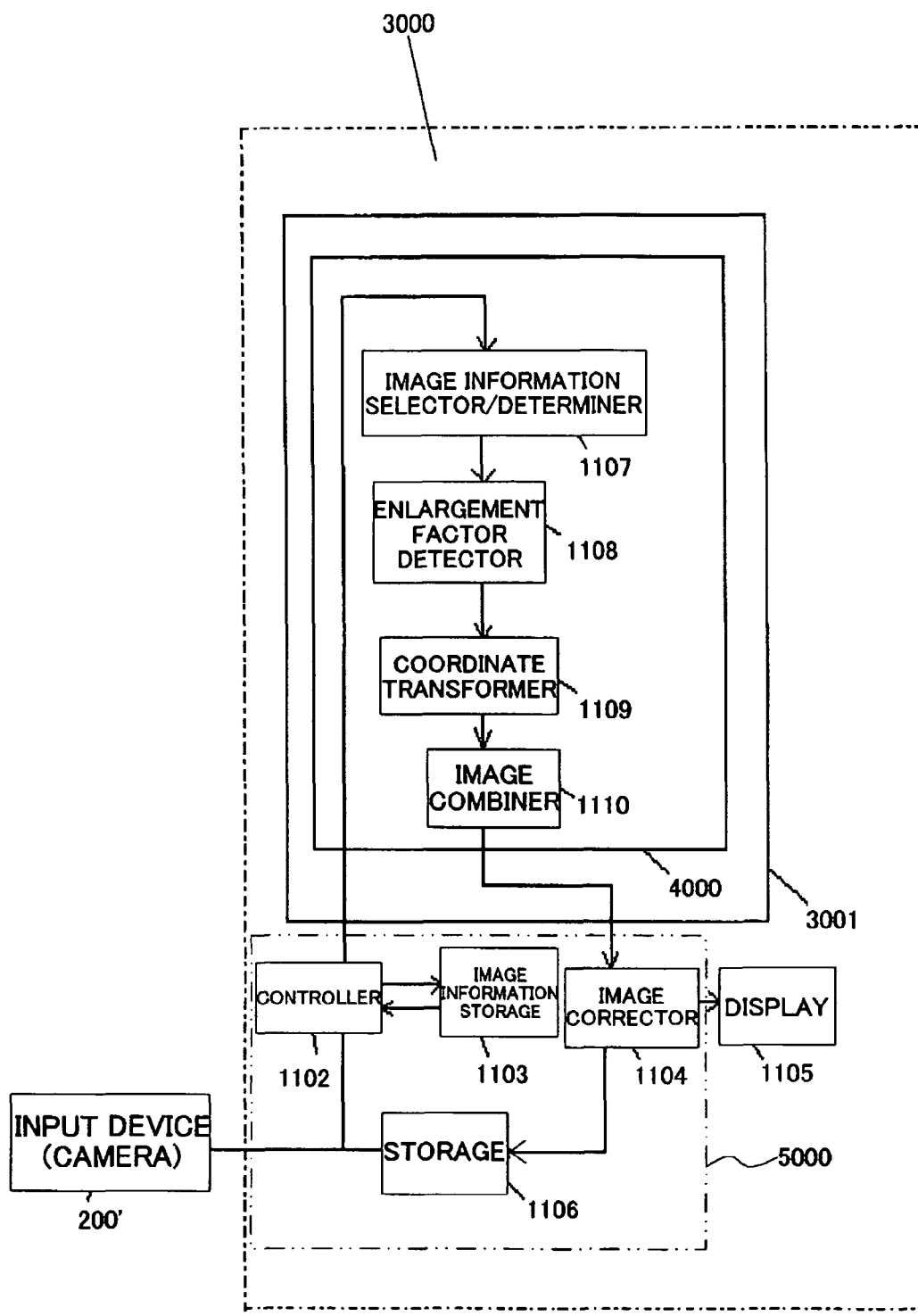
FIG. 9 is a block diagram schematically showing the structure of a personal computer on which an image processing program in Embodiment 3 runs.
Figure 10:
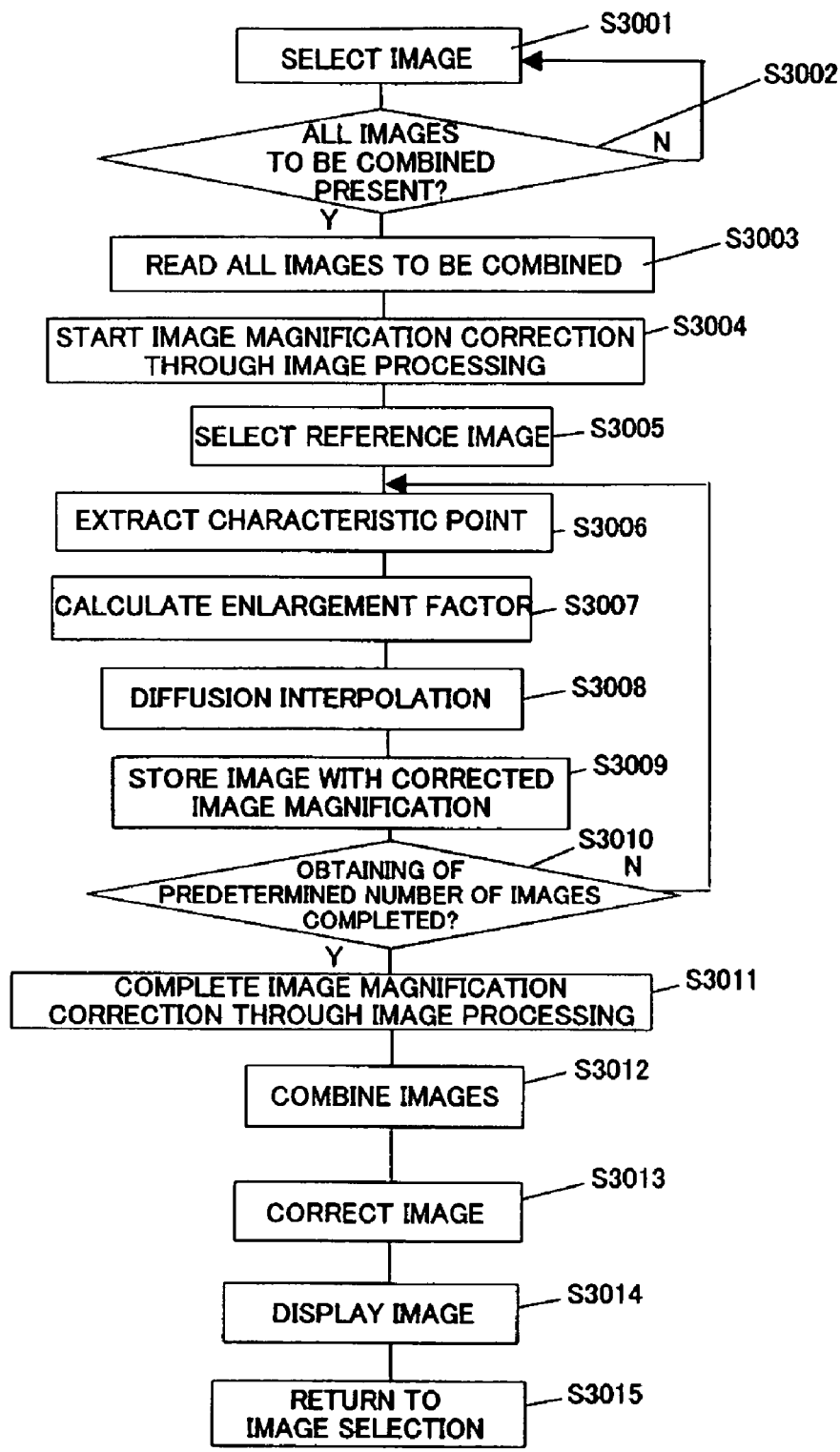
FIG. 10 is a flow chart showing the operation of the camera system of Embodiment 3.

FIG. 9 schematically shows the structure of the personal computer 3000. An image processing program 4000, shown in detail in FIG. 10, is installed on a memory section 3001 such as a hard disk in the personal computer 3000. The image processing program 4000 runs on a typical OS (Operating System).

Hardware 5000 for performing the image magnification correction processing and the image combination processing based on the above mentioned image processing program is shown in a section of the personal computer 3000 except the memory section 3001. The hardware 5000 is formed in accordance with the image processing program in a CPU provided for the personal computer 3000.

A display 1105 is formed of a liquid crystal display or the like for use with the personal computer 3000.

The plurality of divided images and the data provided in the division image pick-up mode and recorded on the recording medium in the camera body 200' shown in FIG. 8 are received by the personal computer 3000 through the USB cable or the infrared communication, and then stored in a storage 1106.

When a user selects a folder in which the plurality of divided images are stored or the plurality of images on the camera body 200' or the personal computer 3000, a controller 1102 starts an image information selector/determiner 1107 in the image processing program 4000. The image information selector/determiner 1107 determines whether or not the number of the selected plurality of divided images stored in the storage 1106 is equal to the number of division of the total image pick-up time period based on the flag and the division number information assigned to each divided image.

The number of the divided images is checked with the flag and the division number information because if all the divided images to be combined are not present in the storage 1106, combination of the insufficient images produces an underexposed image.

The image information selector/determiner 1107 determines which is the image with the highest image magnification of the plurality of divided images based on the image magnification information as signed to each divided image.

An enlargement factor detector 1108 extracts a characteristic point in each divided image and determines the position coordinates of the characteristic point in the image. The characteristic points are selected in the same manner as in Embodiment 1.

A coordinate transformer 1109 performs enlargement processing on the divided images (second images) other than the image with the highest image magnification in the same manner as in Embodiment 1.

An image combiner 1110 superimposes a second plurality of images consisting of the image (a first image) with the highest image magnification and the images (third images) enlarged by the coordinate transformer 1109, and combines them into a single combined image at correct exposure.

The combined image is input to an image corrector 1104 which then performs gamma processing and compression processing. Then, the combined image is displayed as a picked up image in the display 1105 and stored in the storage 1106.

FIG. 10 is a flow chart which represents the details of the above mentioned image processing program.

At step 3001, a user selects the folder of the plurality of divided images or the plurality of divided images stored in the storage 1106, and the flow proceeds to step 3002. At step 3002, as described above, it is checked whether or not the number of divided images to be combined stored in the storage 1106 is equal to the division number of the total image pick-up time period. When the number of divided images stored is equal to the division number, the flow proceeds to step 3003, or the flow returns to step 3001 if not.

At step 3003, all the divided images checked at step 3001 are read from the storage 1106.

At step 3004, image magnification correction processing is started through image processing.

At step 3005, the image magnifications of the respective divided images read at step 3003 are compared to select the image with the highest image magnification as a reference image (the first image). The image magnification correction processing is not performed on the reference image with the highest image magnification. The image magnification correction is not performed on any of the other images that have the same magnification as that of the reference image. However, description will be made assuming that the images other than the reference image have image magnifications lower than that of the reference image.

At step 3006, a characteristic point is determined in each of the reference image and one of the other images serving as the second images.

At step 3007, an enlargement factor is calculated. By the factor, an area of the image compared with the reference image at step 3006 (hereinafter referred to as an image to be corrected) that is included in (corresponds to) the reference image can be enlarged (with coordinate transformation) to have the same image size as that of the reference image. The enlargement factor is calculated in the same manner as in Embodiment 1.

At step 3008, diffusion interpolation is performed in accordance with the enlargement factor calculated at step 3007 to enlarge the area of the image to be corrected that corresponds to the reference image to have the same image size as that of the reference image.

At step 3009, the image enlarged at step 3008, that is, the image with the corrected image magnification (the third image, hereinafter referred to as an image with a corrected magnification) is stored in an image information storage 1103.

At step 3010, it is determined whether or not the image magnification correction processing from step 3006 to step 3009 is completed for all the images other than the reference image. If completed, the flow proceeds to step 3011. If not completed, the processing from step 3006 to step 3009 is performed on the image which is not subjected to image magnification correction.

At step 3011, the image magnification correction of the images other than the reference image through the image processing is finished.

At step 3012, the reference image and the other images with the corrected magnifications are superimposed and combined into a single image (hereinafter referred to as a combined image). If any image originally has the same image magnification as that of the reference image, that image is also combined. In this manner, the single combined image is produced at correct exposure.

At step 3013, the image corrector 1104 performs the gamma correction and compression processing on the combined image.

At step 3014, the combined image output from the image corrector 1104 is displayed in the display 1105 as a picked up image. The combined image output from the image corrector 1104 is stored in the storage 1106.

At step 3015, the flow returns to the image selection.

As described above, according to Embodiment 3, the plurality of images picked up by the camera in the division image pick-up mode are obtained in the personal computer which then produces the plurality of images with the matched image magnifications. The plurality of images are combined into the single image. Thus, the structure of the camera (the camera body) can be simplified as compared with Embodiment 1. In addition, the combined image at correct exposure with high quality and almost no image displacements can be produced from the plurality of images picked up in the division image pick-up mode only by installing the image processing program on the personal computer.

Embodiment 4

Next, description will be made of a single-lens reflex digital camera system serving as an image pick-up system which is Embodiment 4 of the present invention. The structure of the single-lens reflex digital camera system of Embodiment 4 is the same as that shown in Embodiment 1 (in FIG. 1). However, Embodiment 4 differs from Embodiment 1 in the operation of an enlargement factor detector which corresponds to the enlargement factor detector 216 shown in FIG. 1. The enlargement factor detector in Embodiment 4 will hereinafter be described with reference numeral 216'.

The enlargement factor detector 216' of Embodiment 4 performs the following processing on images stored in the image information storage 215 shown in FIG. 1.

As described in Embodiment 1, the image information storage 215 stores all the plurality of images produced in the division image pick-up mode and the calculated image magnification information of each of the images.

The enlargement factor detector 216' first detects which is the image with the highest image magnification of the plurality of obtained images. Specifically, it can detect which image pick-up operation produced the image with the highest image magnification based on the image magnification information calculated and stored in the image information storage 215.

Figure 11:
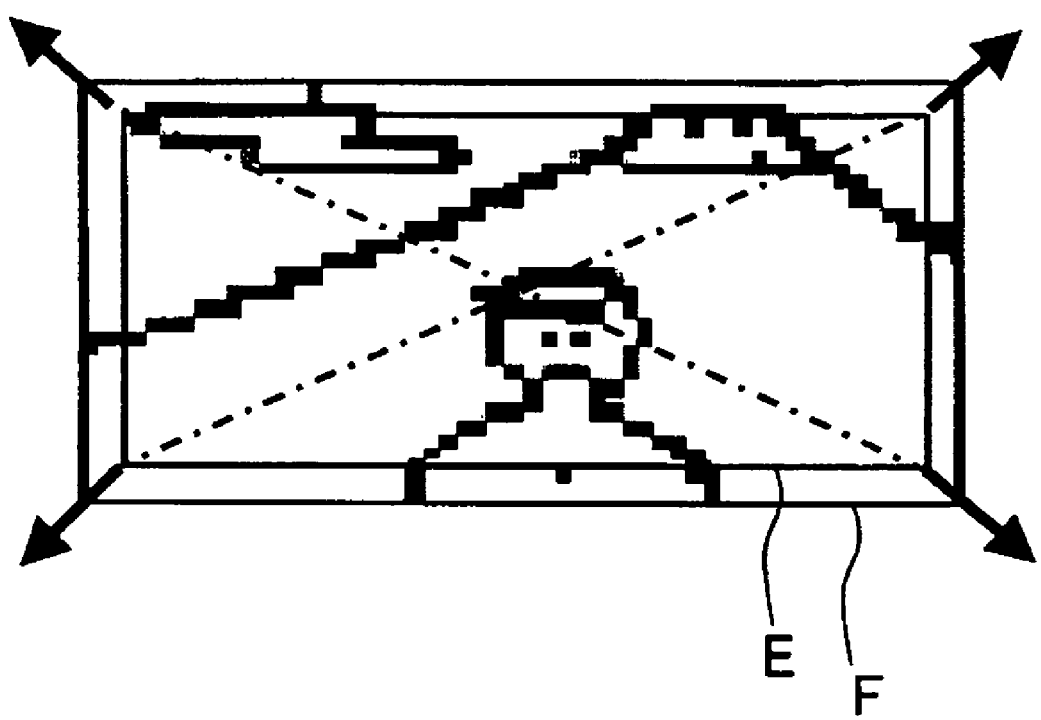
FIG. 11 shows an example of image magnification correction in a single-lens reflex camera system which is Embodiment 4 of the present invention.

The enlargement factor detector 216' uses the image magnification information of a reference image with the highest image magnification and the image magnification information of one of the other images to be corrected (assuming that the other images have image magnifications lower than the highest image magnification) to calculate the image size of an area of the image to be corrected that is similar to the reference image. The area of the image to be corrected that is similar to the reference image is referred to as a similar-to-reference image area. The image size is the size centered on the intersection of the diagonal lines in the image. As shown in FIG. 11, the enlargement factor detector 216' determines the enlargement factor for enlarging the similar-to-reference image area E to the same size as that of the reference image F.

Next, based on the calculated enlargement factor, the coordinate transformer 217 shown in FIG. 1 performs diffusion interpolation of the similar-to-reference image area to achieve coordinate transformation, thereby enlarging the image of the similar-to-reference image area to the same size as that of the reference image (image magnification correction). The coordinate transformer 217 performs the same processing on the other images to be corrected. The image combiner 218 shown in FIG. 1 superimposes the reference image and the images after the image magnification correction processing and combines them into a single combined image.

Figure 12:
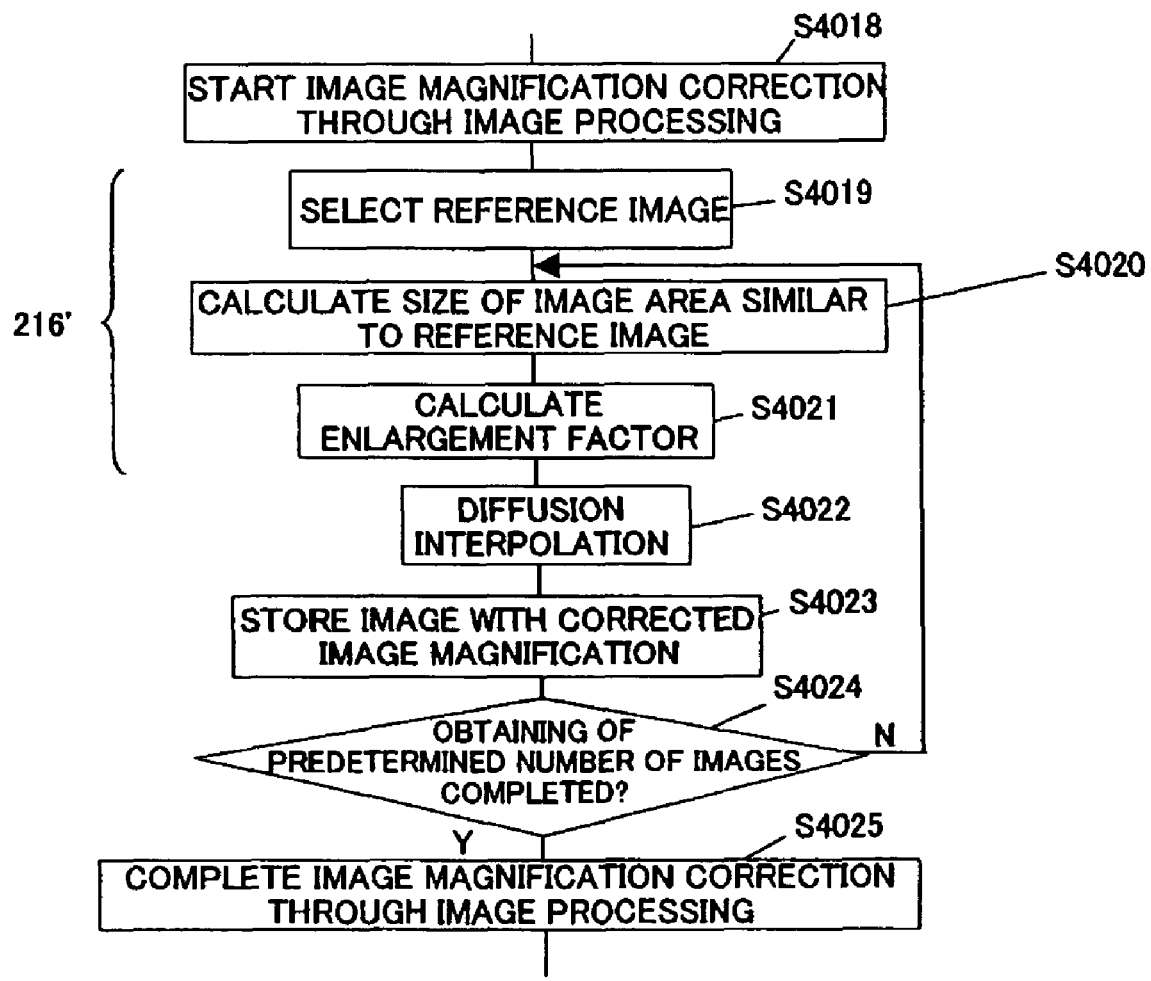
FIG. 12 is a flow chart showing the operation of the camera system of Embodiment 4.

FIG. 12 is a flow chart showing the details of the processing in Embodiment 4. The flow chart replaces the operations from step 1018 to step 1025 in the flow chart of FIG. 2 described in Embodiment 1. The steps of the flow chart not shown in FIG. 12 are identical to those in FIG. 2.

At step 4018, the image magnification correction is started through image processing.

First, at step 4019, the image magnifications of the respective images calculated at step 1015 in FIG. 2 are compared, and the image with the highest image magnification is selected as a reference image which is a first image. The image magnification correction, later described, is not performed on the reference image with the highest image magnification. The image magnification correction is not performed on any of the other images that have the same magnification as that of the reference image. However, description will be made assuming that the images other than the reference image have image magnifications lower than that of the reference image.

At step 4020, as described above, the size of the similar-to-reference image area of one of the plurality of images to be corrected is calculated on the basis of the image magnification information of the reference image which is the image with the highest image magnification and the image magnification information of that image to be corrected.

At step 4021, an enlargement factor is calculated for enlarging (with coordinate transformation) the similar-to-reference image area to the same image size as that of the reference image. The operations from step 4019 to 4021 are performed by the enlargement factor detector 216' of Embodiment 4.

At step 4022, diffusion interpolation is performed in accordance with the enlargement factor calculated at step 4021 to enlarge the similar-to-reference image area of the image to be corrected to the same image size as that of the reference image.

At step 4023, the image enlarged at step 4022, that is, the image with the corrected image magnification (a third image, hereinafter referred to as an image with a corrected magnification) is stored in the image information storage 215.

At step 4024, it is determined whether or not the image magnification correction processing from step 4020 to step 4023 is completed for all the images other than the reference image. If completed, the flow proceeds to step 4025. If not completed, the processing from step 4020 to step 4023 is performed on the image which is not subjected to image magnification correction.

At step 4025, the image magnification correction through the image processing is finished.

According to Embodiment 4, the enlargement factor of the image to be corrected can be determined without complicated processing such as the extraction of the characteristic point in the image and the calculations of its displacement performed in Embodiment 1. It is thus possible to provide the combined image at correct exposure with high quality and almost no image displacements from the plurality of images picked up in the division image pick-up mode while an increased burden of the calculations is reduced.

Embodiment 5

Next, description will be made of the processing in a compact digital camera system which is Embodiment 5 of the present invention. The structure of the compact digital camera system of Embodiment 5 is the same as that shown in Embodiment 2 (in FIG. 6). However, Embodiment 5 differs from Embodiment 2 in the operation of an enlargement factor detector which corresponds to the enlargement factor detector 625 shown in FIG. 6. The enlargement factor detector in Embodiment 5 will hereinafter be described with reference numeral 625'.

The enlargement factor detector 625' of Embodiment 5 performs the following processing on images stored on the image information storage 624 shown in FIG. 6.

As described in Embodiment 2, the image information storage 624 stores all the plurality of images produced in the division image pick-up mode and the calculated image magnification information of each of the images.

The enlargement factor detector 625' first detects which is the image with the highest image magnification of the plurality of obtained images. Specifically, it can detect which image pick-up operation produced the image with the highest image magnification based on the image magnification information calculated and stored in the image information storage 624.

The enlargement factor detector 625' uses the image magnification information of a reference image with the highest image magnification and the image magnification information of one of the other images to be corrected (assuming that the other images have image magnifications lower than the highest image magnification) to calculate the image size of an area of the image to be corrected that is similar to the reference image. The area of the image to be corrected that is similar to the reference image is referred to as a similar-to-reference image area. The image size is the size centered on the intersection of the diagonal lines in the image. As described in Embodiment 4 with reference to FIG. 11, the enlargement factor detector 625' determines the enlargement factor for enlarging the similar-to-reference image area E to the same size as that of the reference image F.

Next, based on the calculated enlargement factor, the coordinate transformer 626 shown in FIG. 6 performs diffusion interpolation of the similar-to-reference image area to achieve coordinate transformation, thereby enlarging the image of the similar-to-reference image area to the same size as that of the reference image (image magnification correction). The coordinate transformer 626 performs the same processing on the other images to be corrected. The image combiner 627 shown in FIG. 6 superimposes the reference image and the images after the image magnification correction processing and combines them into a single combined image.

Figure 13:
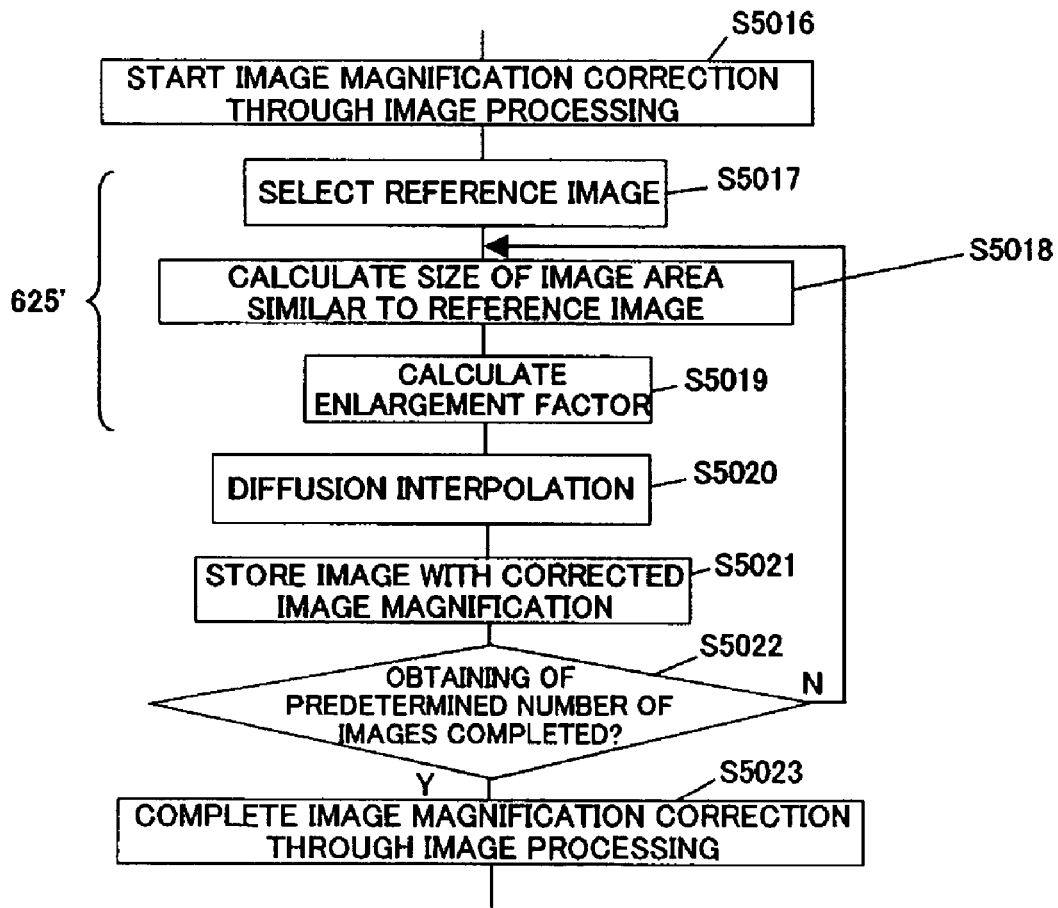
FIG. 13 is a flow chart showing the operation of a compact digital camera which is Embodiment 5 of the present invention.

FIG. 13 is a flow chart showing the details of the processing in Embodiment 5. The flow chart replaces the operations from step 2016 to step 2023 in the flow chart of FIG. 7 described in Embodiment 2. The steps of the flow chart not shown in FIG. 13 are identical to those in FIG. 7.

At step 5016, the image magnification correction through image processing is started.

First, at step 5017, the image magnifications of the respective images calculated at step 2013 in FIG. 7 are compared, and the image with the highest image magnification is selected as a reference image which is a first image. The image magnification correction, later described, is not performed on the reference image with the highest image magnification. The image magnification correction is not performed on any of the other images that have the same magnification as that of the reference image. However, description will be made assuming that the images other than the reference image have image magnifications lower than that of the reference image.

At step 5018, as described above, the size of the similar-to-reference image area of one of the plurality of images to be corrected is calculated on the basis of the image magnification information of the reference image which is the image with the highest image magnification and the image magnification information of that image to be corrected.

At step 5019, an enlargement factor is calculated for enlarging (with coordinate transformation) the similar-to-reference image area to the same image size as that of the reference image. The operations from step 5017 to 5019 are performed by the enlargement factor detector 625' of Embodiment 5.

At step 5020, diffusion interpolation is performed in accordance with the enlargement factor calculated at step 5019 to enlarge the similar-to-reference image area of the image to be corrected to the same image size as that of the reference image.

At step 5021, the image enlarged at step 5020, that is, the image with the corrected image magnification (a third image, hereinafter referred to as an image with a corrected magnification) is stored in the image information storage 624.

At step 5022, it is determined whether or not the image magnification correction processing from step 5018 to step 5021 is completed for all the images other than the reference image. If completed, the flow proceeds to step 5023. If not completed, the processing from step 5018 to step 5021 is performed on the image which is not subjected to image magnification correction.

At step 5023, the image magnification correction through the image processing is finished.

According to Embodiment 5, the enlargement factor of the image to be corrected can be determined without complicated processing such as the extraction of the characteristics point in the image and the calculations of its displacement performed in Embodiment 1. It is thus possible to provide the combined image at correct exposure with high quality and almost no image displacements from the plurality of images picked up in the division image pick-up mode while an increased burden of the calculations is reduced.

Embodiment 6

Next, description will be made of an image processing program which is Embodiment 6 of the present invention. The image processing program of Embodiment 6 is installed on the personal computer in FIG. 9 described in Embodiment 3 instead of the image processing program of Embodiment 3.

A camera picks up a plurality of images which are then input to the personal computer in a division image pick-up mode. The camera has the same structure as that shown in Embodiment 3 (FIG. 8).

Embodiment 6 differs from Embodiment 3 in the operation of an enlargement factor detector which corresponds to the enlargement factor detector 1108 shown in FIG. 9. The enlargement factor detector in Embodiment 6 will hereinafter be described with reference numeral 1108'.

The enlargement factor detector 1108' of Embodiment 6 performs the following processing on images stored on the storage 1106 shown in FIG. 9.

The storage 1106 stores all the plurality of images produced in the division image pick-up mode and the calculated image magnification information of each of the images.

The enlargement factor detector 1108' first detects which is the image with the highest image magnification of the plurality of obtained images. Specifically, it can detect which image pick-up operation produced the image with the highest image magnification based on the image magnification information calculated and stored in the storage 1106.

The enlargement factor detector 1108' uses the image magnification information of a reference image with the highest image magnification and the image magnification information of one of the other images to be corrected (assuming that the other images have image magnifications lower than the highest image magnification) to calculate the image size of an area of the image to be corrected that is similar to the reference image. The area of the image to be corrected that is similar to the reference image is referred to as a similar-to-reference image area. The image size is the size centered on the intersection of the diagonal lines in the image. As described in Embodiment 4 with reference to FIG. 11, the enlargement factor detector 1108' determines the enlargement factor for enlarging the similar-to-reference area E to the same size as that of the reference image F.

Next, based on the calculated enlargement factor, the coordinate transformer 1109 shown in FIG. 9 performs diffusion interpolation of the similar-to-reference image area to achieve coordinate transformation, thereby enlarging the image of the similar-to-reference image area to the same size as that of the reference image (image magnification correction). The coordinate transformer 1109 performs the same processing on the other images to be corrected. The image combiner 1110 shown in FIG. 9 superimposes the reference image and the images after the image magnification correction processing and combines them into a single combined image.

Figure 14:
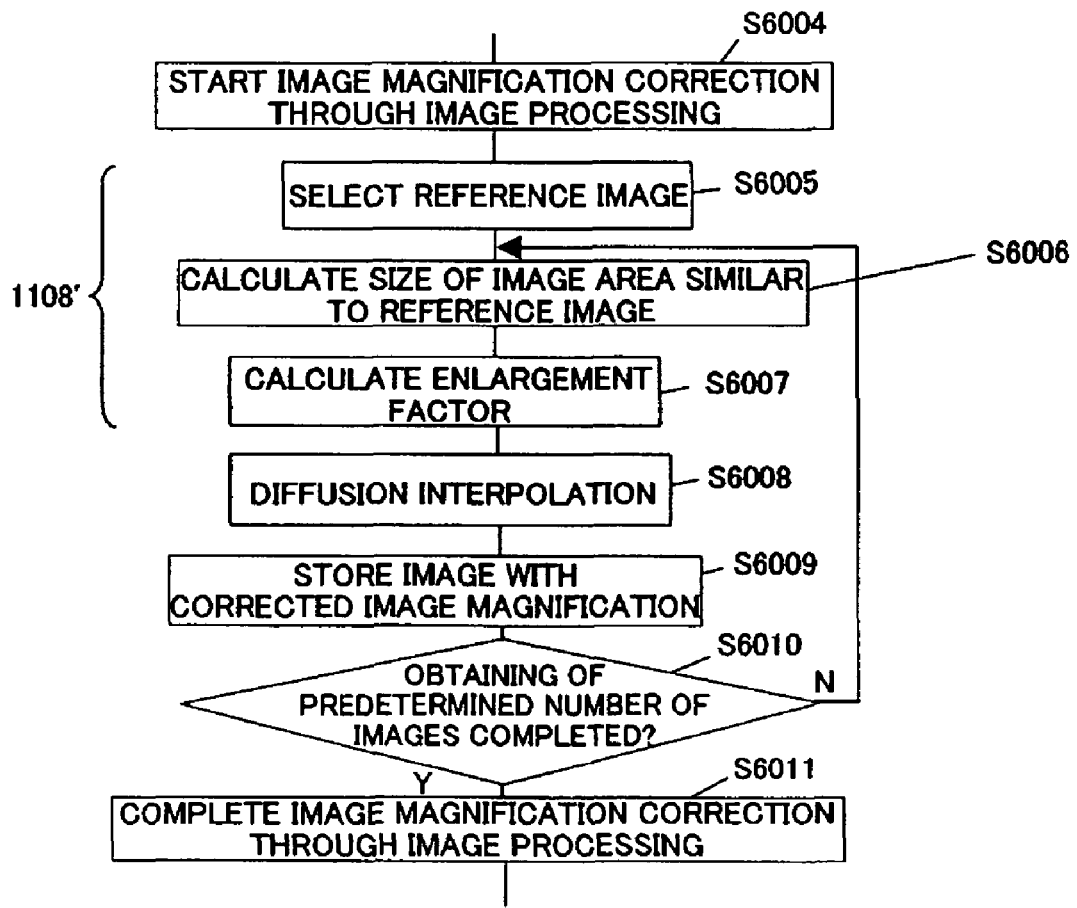
FIG. 14 is a flow chart showing the operation of an image processing program which is Embodiment 6 of the present invention.

FIG. 14 is a flow chart showing the details of the processing in Embodiment 6. The flow chart replaces the operations from step 3004 to step 3011 in the flow chart of FIG. 10 described in Embodiment 3. The steps of the flow chart not shown in FIG. 14 are identical to those in FIG. 10.

At step 6004, the image magnification correction through image processing is started.

At step 6005, the image magnifications of the respective images calculated at step 3003 in FIG. 10 are compared, and the image with the highest image magnification is selected as a reference image. The image magnification correction is not performed on the reference image with the highest image magnification. The image magnification correction is not performed on any of the other images that have the same magnification as that of the reference image. However, description will be made assuming that the images other than the reference image have image magnifications lower than that of the reference image.

At step 6006, as described above, the size of the similar-to-reference image area of one of the plurality of images to be corrected is calculated on the basis of the image magnification information of the reference image which is the image with the highest image magnification and the image magnification information of that image to be corrected.

At step 6007, an enlargement factor is calculated for enlarging (with coordinate transformation) the similar-to-reference image area to the same image size as that of the reference image. The operations from step 6005 to 6007 are performed by the enlargement factor detector 1108' of Embodiment 6.

At step 6008, diffusion interpolation is performed in accordance with the enlargement factor calculated at step 6007 to enlarge the similar-to-reference image area of the image to be corrected to the same image size as that of the reference image.

At step 6009, the image enlarged at step 6008, that is, the image with the corrected image magnification (a third image, hereinafter referred to as an image with a corrected magnification) is stored in the image information storage 1103.

At step 6010, it is determined whether or not the image magnification correction processing from step 6006 to step 6009 is completed for all the images other than the reference image. If completed, the flow proceeds to step 6011. If not completed, the processing from step 6006 to step 6009 is performed on the image which is not subjected to image magnification correction.

At step 6011, the image magnification correction through the image processing is finished.

As described above, according to Embodiment 6, the plurality of images picked up by the camera in the division image pick-up mode are obtained in the personal computer which then produces the plurality of images with the matched image magnifications and combines those images into the single image. Thus, the structure of the camera (the camera body) can be simplified as compared with Embodiment 1. It is also possible to provide the combined image at correct exposure with high quality and almost no image displacements from the plurality of images picked up in the division image pick-up mode only by installing the image processing program on the personal computer.

In addition, the enlargement factor of the image to be corrected can be determined without complicated processing such as the extraction of the characteristic point in the image and the calculations of its displacement performed in Embodiment 3. It is thus possible to provide the combined image with high quality from the plurality of images picked up in the division image pick-up mode while an increased burden of the calculations is reduced.

Figure 15:
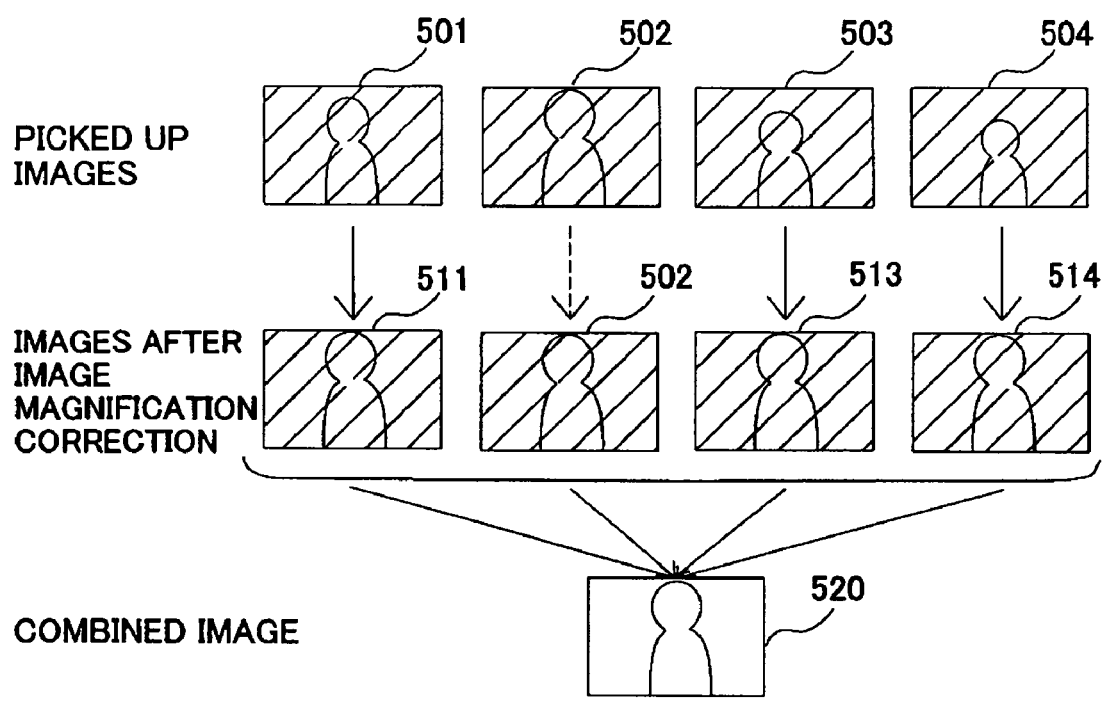
FIG. 15 shows image processing according to Embodiments 1 to 6.

FIG. 15 shows the image processing common to Embodiments 1 to 6. FIG. 15 shows, in its upper section, four images 501 to 504 as the first plurality of images produced through the plurality of image pick-up operations (four in this case) in the division image pick-up mode. The second image from the left (the first image: the reference image) 502 has the highest image magnification. While the other three images (the second images: the images to be corrected) 501, 503, and 504 have the image magnifications which are lower than that of the reference image and are different from each other. Since the four images 501 to 504 are picked up by dividing the total image pick-up time period into four, each has an exposure of ¼ of the correct exposure (hatching in FIG. 15 represents underexposure).

FIG. 15 shows, in its intermediate section, three images (the third images) 511, 513, and 514 which have image magnifications matched to the image magnification of the reference image 502 by performing image magnification correction on the three images to be corrected 501, 503, and 504, that is, enlargement processing through coordinate transformation. The three images 511, 513, and 514 with the corrected image magnifications and the reference image 502 constitute the second plurality of images.

The reference image 502 and the three images 511, 513, and 514 with the corrected image magnifications are superimposed and combined into a single combined image 520 at correct exposure with almost no image displacements as shown in a lower section of FIG. 15.

Embodiment 7

Embodiments 1 to 3 have been described in conjunction with the case where the image with the highest image magnification is selected as the reference image from the plurality of images picked up in the division image pick-up mode, and the image magnification correction is performed through the enlargement processing to match the image magnifications of the other images to that of the reference image. However, the image magnification correction is not limited thereto. For example, the image with the lowest image magnification may be selected as the reference image, and the image magnification correction may be performed through reduction processing to match the image magnifications of the other images to that of the reference image.

Embodiment 7 of the present invention will be described in conjunction with the image magnification correction through the reduction processing as a variation of Embodiments 1 to 3. In this case, the enlargement factor detectors 216, 625, and 1108 in the digital camera and the image processing program in Embodiments 1 to 3, respectively, are replaced with a reduction factor detector. The operation thereof will be described briefly.

The reduction factor detector of Embodiment 7 first detects which is the image with the lowest image magnification of the plurality of obtained images. Specifically, it can detect which image pick-up operation produced the image with the lowest image magnification based on the image magnification information stored in the image information storages 215, 624 or the storage 1106 of Embodiments 1 to 3.

Next, the reduction factor detector compares the image having the lowest image magnification (a first image) with another image with a higher image magnification (a second image), extracts characteristic points in the image with the lowest image magnification and the other image, and the calculates the position coordinates of the characteristic points in the image pick-up screen.

For example, as shown in FIG. 5, a user attempts to take an image in which a man 501 is standing against a building 502 as a background in a frame (A). If movements of the camera occur in the focus direction in the subsequent image pick-up operation, the resulting image as shown in a frame (B) has a different image magnification from that in the frame (A). The frame (B) has an image magnification higher than that in the frame (A), and the frame (A) has the lowest image magnification of the images provided through the plurality of image pick-up operations.

Figure 16:
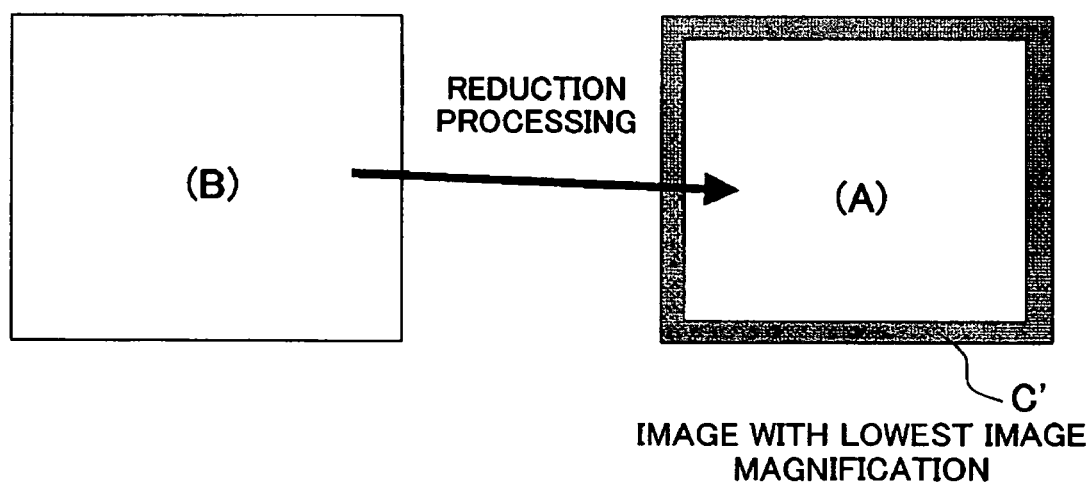
FIG. 16 is a diagram for explaining image magnification correction in Embodiment 7 of the present invention.

The reduction factor detector performs edge detection to extract as a characteristic point an edge 508 of a window 507, which is a point at high luminance, in a building 506 located in the peripheral portion of the screen in the frame (B). Next, the detector compares the characteristic point 508 with a characteristic point 504 in the frame (A) having the lowest image magnification to calculate a displacement amount (a motion vector or a scalar quantity) which represents the difference between them. Then, the coordinate transformer performs reduction processing (coordinate transformation processing) such that the coordinates of the end points of the characteristic point 508 (C and D shown in the enlarged view (b) in FIG. 5) are matched to the coordinates of points (A and B shown in the enlarged view (a) in FIG. 5) of the characteristic point 504 that correspond to those end points. In other words, as shown in FIG. 16, the reduction processing is performed such that size of the area of the image of the frame (B) with the high image magnification is matched to the size of the area of the image of the frame (A) with the lowest image magnification that corresponds to the image of the frame (B). The coordinate transformer corresponds to the coordinate transformers 217, 626, and 1109 of Embodiments 1 to 3.

The area shown by C' in FIG. 16 is not picked up in the images other than the image with the lowest image magnification. Thus, in Embodiment 7, the gain is increased for the area C' in association with the number of images to be combined. This can produce the area C' included at correct exposure in the combined image.

Embodiment 8

Embodiments 4 to 6 have been described in conjunction with the case where the image with the highest image magnification is selected as the reference image from the plurality of images picked up in the division image pick-up mode, and the image magnification correction is performed through the enlargement processing to match the image magnifications of the other images to that of the reference image. However, the image magnification correction is not limited thereto. For example, the image with the lowest image magnification is selected as the reference image, and the image magnification correction is performed through reduction processing to match the image magnifications of the other images to that of the reference image.

Embodiment 8 of the present invention will be described in conjunction with the image magnification correction through the reduction processing as a variation of Embodiments 4 to 6. In this case, the enlargement factor detectors 216', 625', and 1108' in the digital camera and the image processing program in Embodiments 4 to 6, respectively, are replaced with a reduction factor detector. The operation thereof will be described briefly.

The reduction factor detector of Embodiment 8 first detects which is the image with the lowest image magnification of the plurality of obtained images. Specifically, it can detect which image pick-up operation produced the image with the lowest image magnification based on the image magnification information stored in the image information storage or the storage of Embodiments 4 to 6.

Next, the reduction factor detector uses the image magnification information of the reference image which is the image with the lowest image magnification and the image magnification information of one of the image to be corrected to calculate the image size of an area of the reference image that is similar to the image to be corrected (hereinafter referred to as a similar-to-corrected image area). The image size is the size centered on the intersection of the diagonal lines in the image. The detector determines the reduction factor for reducing the image to be corrected to have the same size as the similar-to-corrected image area in the reference image.

Next, the coordinate transformer performs reduction processing (coordinate transformation processing) to match the image to be corrected with the high image magnification to the size of the similar-to-corrected image area of the image with the lowest image magnification that corresponds to the image to be corrected.

In this case, as shown in FIG. 16 in Embodiment 7, the area shown by C' is not picked up in the images other than the image with the lowest image magnification. Thus, in Embodiment 8, the gain is increased for the area C' in association with the number of images to be combined. This can produce the area C' included at correct exposure in the combined image.

Embodiment 9

Each of Embodiments 1 to 8 has been described in conjunction with the case where the image with the highest or lowest image magnification is selected as the reference image from the plurality of images picked up in the division image pick-up mode, and the image magnification correction is performed to match the image magnifications of the other images to that of the reference image. However, the image magnification correction is not limited thereto. An image with an arbitrary image magnification (for example, an image picked up in the first image pick-up operation of a plurality of images) may be used as a reference image.

In this case, if one of the images other than the reference image has an image magnification higher than that of the reference image, the image magnification correction is performed through the reduction processing described in Embodiments 7 and 8. If one of the images other than the reference image has an image magnification lower than that of the reference image, the image magnification correction is performed through the enlargement processing described in Embodiments 1 to 6.

Each of Embodiments 1 to 9 has been described in conjunction with the case where the positions of the focus lens and the zoom lens (the focus area and the zoom area) are first detected to provide the object distance information and the focal length information which are then used to calculate the image magnification of each image. Based on the calculated image magnification information, the subsequent processing is performed. However, the image magnification may not necessarily be calculated. The object distance information and the focal length information may be used as the information on the image magnification and the subsequent processing may be performed with the information.

Alternatively, the displacement (including the displacement direction) of the characteristic point in the image picked up in the division image pick-up mode may be used as the information on the image magnification. In this case, the image magnification of the reference image does not need to be calculated, and the displacement of the characteristic point corresponding to the difference in image magnification between the reference image and other images may be calculated and used as the information on the image magnification.

Each of Embodiments 1 to 9 has been described in conjunction with the case where the camera is held by the hands of a user and the image magnification is changed. The operations as described in Embodiments 1 to 9 may be performed when a tripod is used for picking up images or when the camera is held by the hand of a user and the image magnification is not changed.

Figure 17:
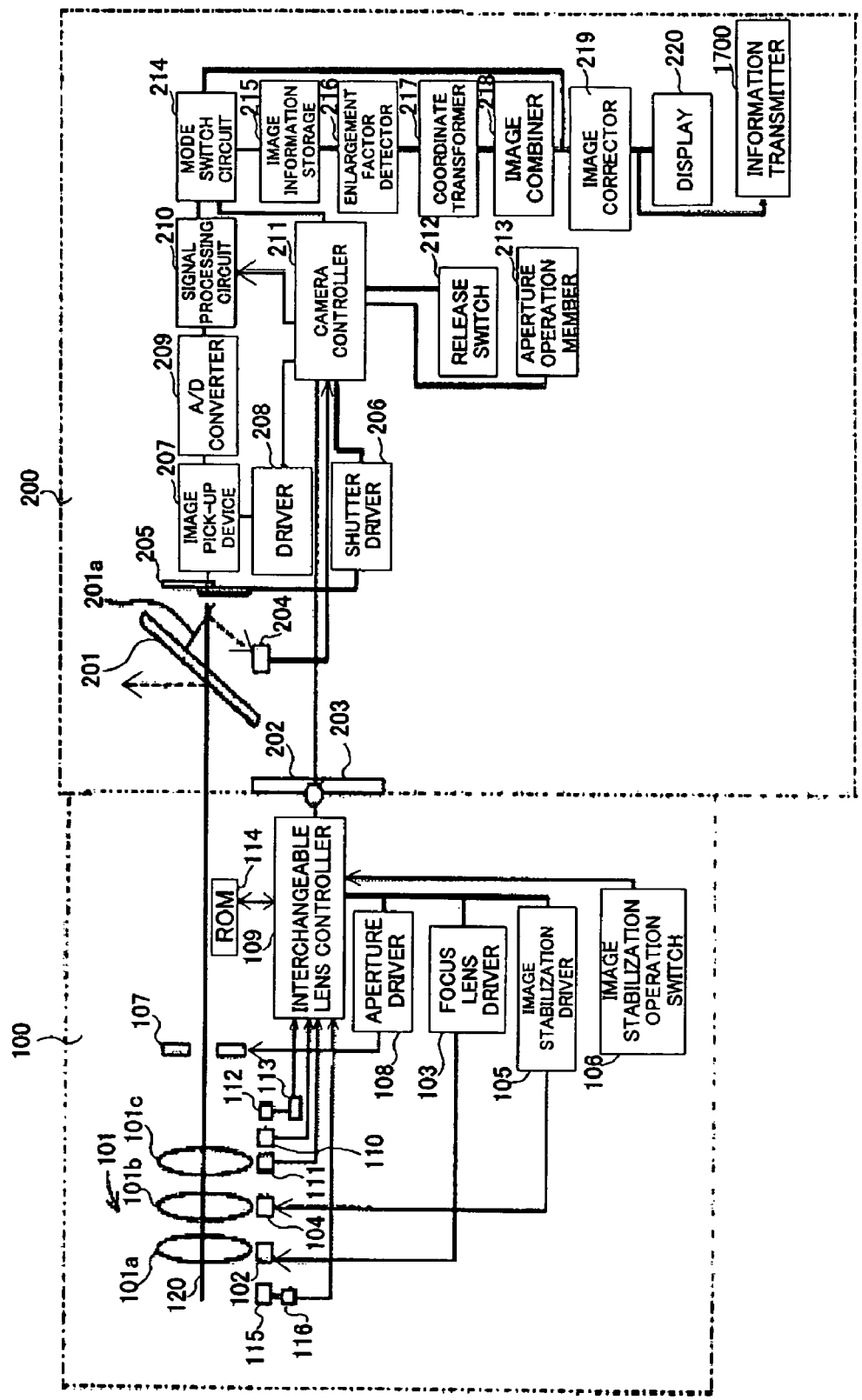
FIG. 17 is a block diagram schematically showing the structure of a single-lens reflex digital camera system which is Embodiments 1, 4, 7, 8, and 9 of the present invention.
Figure 18:
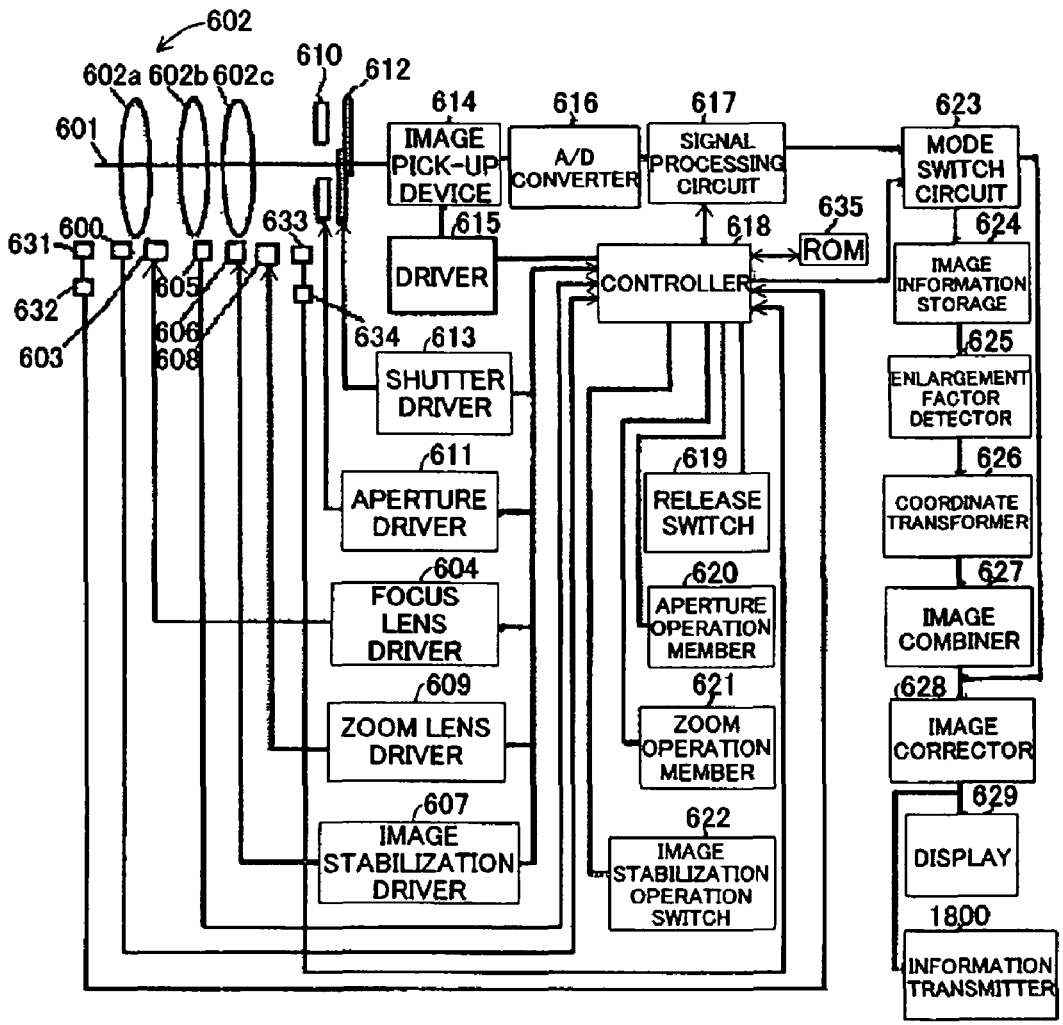
FIG. 18 is a block diagram schematically showing the structure of a compact digital camera system which is Embodiments 2, 5, 7, 8, and 9 of the present invention.
Figure 19:
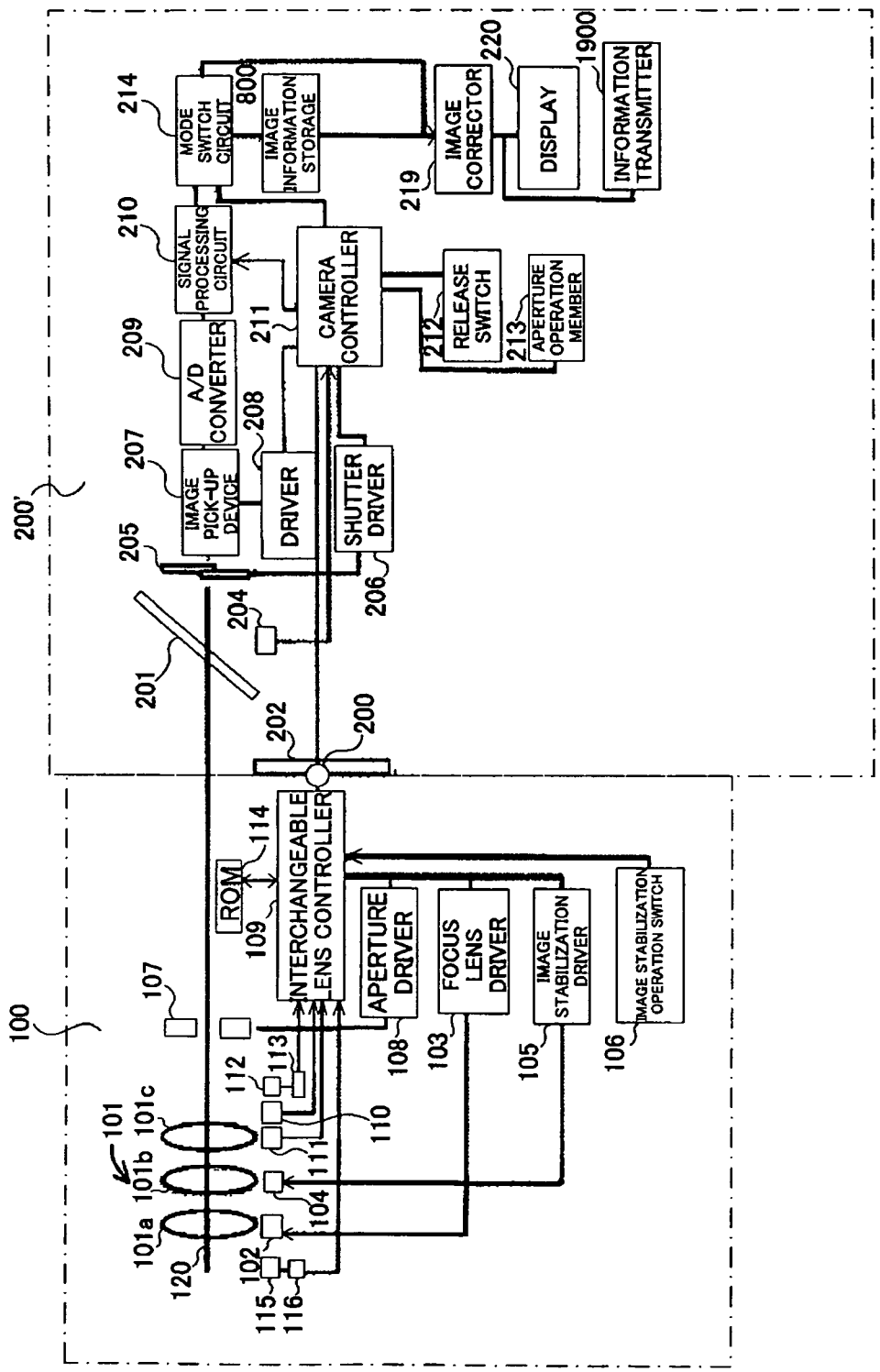
FIG. 19 is a block diagram schematically showing the structure of a single-lens reflex digital camera system which is Embodiments 3, 6, 7, 8, and 9 of the present invention.
Figure 20:
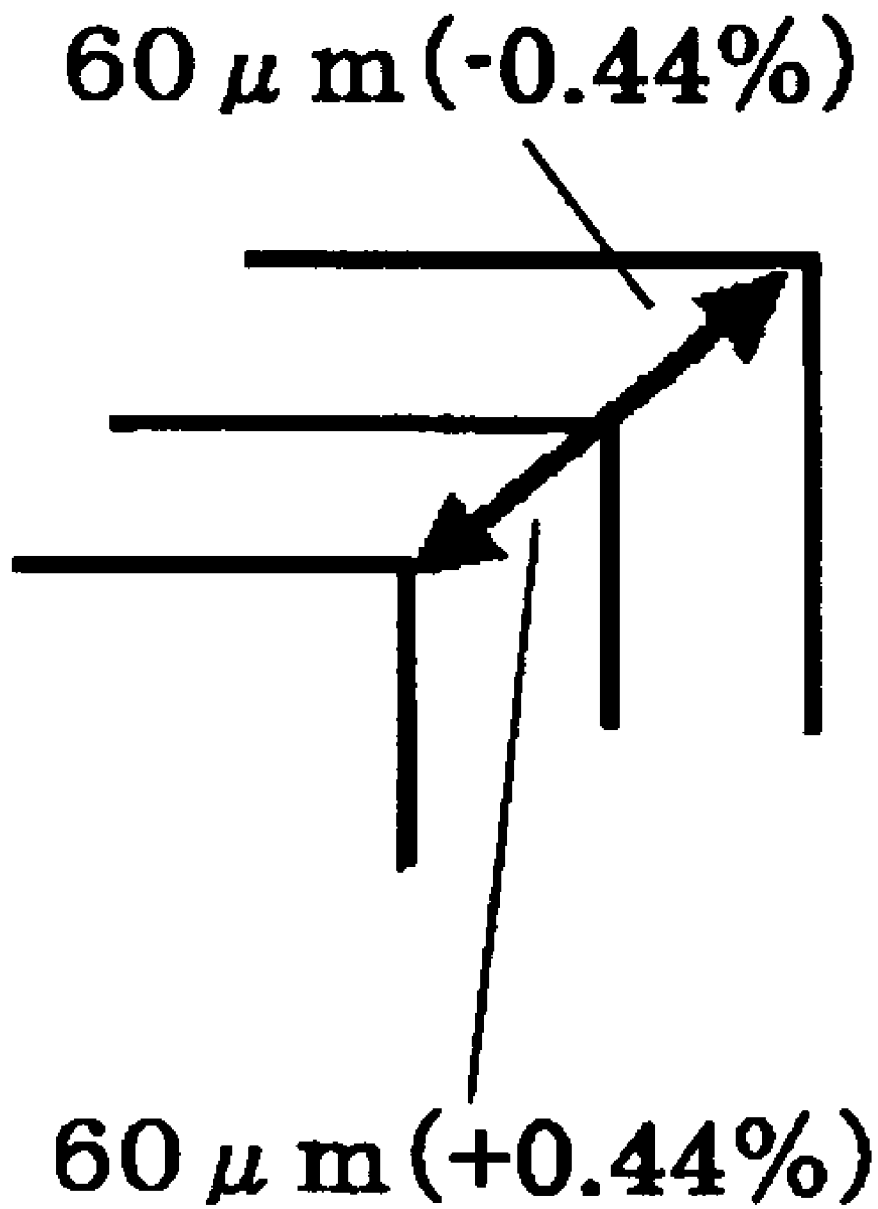
FIG. 20 is a diagram for explaining an image displacement in the peripheral portion of an image.
Figure 21:
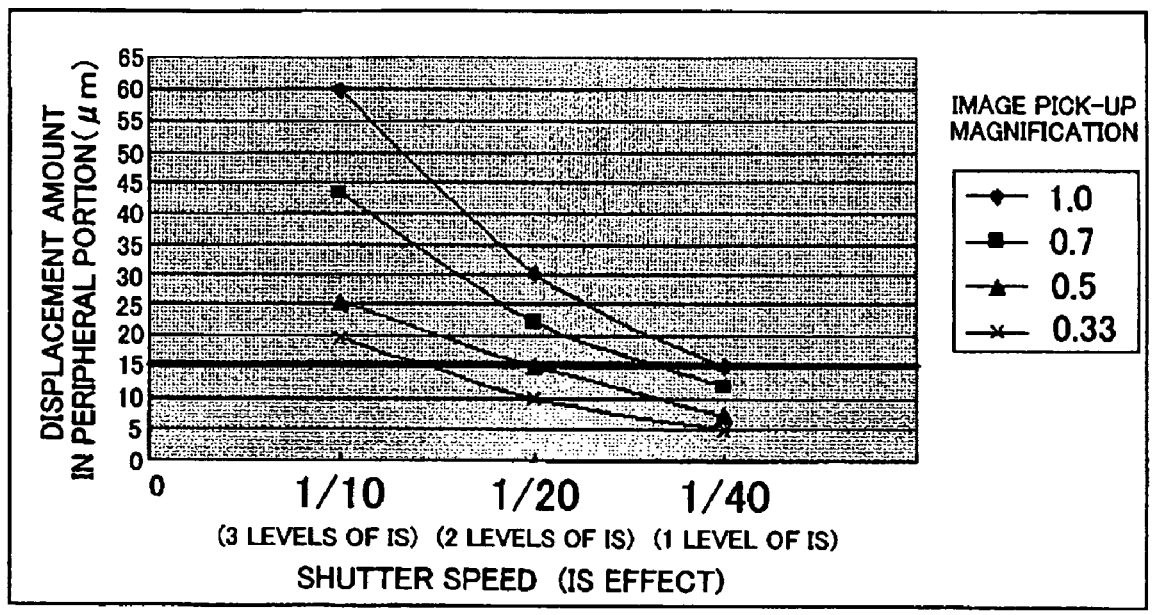
FIG. 21 shows the relationship between a displacement in the peripheral portion of an image and a shutter speed for each image pick-up magnification.

In the camera system described in Embodiments 1 to 9, the recorder shown as 221 in FIG. 1, as 630 in FIG. 6, or as 221 in FIG. 8 may be replaced with an information transmitter shown as 1700 in FIG. 17, as 1800 in FIG. 18, or as 1900 in FIG. 19. The information transmitter has the function of transmitting information to another apparatus with infrared rays, Bluetooth, a USB cable, a wireless LAN, IEEE1394, GSM, or GPRS. The other apparatus means an apparatus typified by a personal computer and a printer which has a recording medium for recording the received information and a means for processing the information.

According to each of Embodiments 1 to 9, the second plurality of images are formed on the basis of the first plurality of images and the information on the image magnification. The single combined image is formed from the second plurality of images. The clear combined image can be provided with substantially no image displacement even when the images included in the first plurality of images have different image magnifications. Consequently, the single image can be produced with high quality by the plurality of image pick-up operations each including the focus adjustment operation even when the focus adjustment operations in the image pick-up operations result in the first plurality of images having different image magnifications.

In each of Embodiments 1 to 9, the single image is produced by the plurality of image pick-up operations, the focus adjustment operation is performed before each of the image pick-up operations, and the information on the image magnification of each image is created. The information on the image magnification can be used to easily produce the second plurality of images for combination into the single image. Consequently, even when the first plurality of images have different image magnifications, the clear single image can be produced with high quality.

Furthermore, the present invention is not limited to these preferred embodiments and various variations and modifications may be made without departing from the scope of the present invention.

This application claims foreign priority benefits based on Japanese Patent Applications Nos. 2005-187883, filed on Jun. 28, 2005, and 2005-277406, filed on Sep. 26, 2005, each of which is hereby incorporated by reference herein in its entirety as if fully set forth herein.

What is claimed is:

1. An image pick-up apparatus comprising:
a first detector configured to detect focus fluctuations during the successive image pick-up operations of a first plurality of images;
a second detector configured to detect an object distance;
an image pick-up controller configured to perform a plurality of image pick-up operations to produce the first plurality of images and configured to perform focus adjustment operation based on an output from the first detector before each of the image pick-up operations, the output from the first detector including a displacement amount and a displacement direction in a focus direction;
an information producer configured to produce information on an image magnification of each of the first plurality of image by using the object distance detected by the second detector, and the focus fluctuations during the successive image-pickup operations of the plurality of images detected by the first detector;
an image producer configured to produce, from the first plurality of images based on the information on the image magnification, a second plurality of images having matched image magnifications; and
an image combiner configured to combine the second plurality of images to produce a single image,
wherein the first plurality of images include a first image and a second image having an image magnification different from an image magnification of the first image,
wherein the image producer produces a third image from the second image, the third image having an image magnification identical to the image magnification of the first image, and
wherein the second plurality of images include the first image and the third image.

2. The image pick-up apparatus according to claim 1, wherein the image producer is configured to select one of the first plurality of images that has the highest or lowest image magnification as the first image.

3. The image pick-up apparatus according to claim 1, wherein the image producer is configured to extract a characteristic point in each of the first plurality of images and configured to perform coordinate transformation processing of the second image such that the characteristic points in the first image and the second image are matched.

4. The image pick-up apparatus according to claim 1, wherein the image producer is configured to perform coordinate transformation processing of the second image based on the information on the image magnification of each of the first plurality of images.

5. An image pick-up system comprising:
an image pick-up apparatus including: a first detector configured to detect focus fluctuations during the successive image pick-up operations of a first plurality of images, a second detector configured to detect an object distance, an image pick-up controller configured to perform a plurality of image pick-up operations to produce the first plurality of images and configured to perform focus adjustment operation based on an output from the first detector before each of the image pick-up operations, the output from the first detector including a displacement amount and a displacement direction in a focus direction, an information producer configured to produce information on an image magnification of each of the first plurality of image by using the object distance detected by the second detector, and the information detected by the first detector, an image producer configured to produce, from the first plurality of images based on the information on the image magnification, a second plurality of images having matched image magnifications, and an image combiner configured to combine the second plurality of images to produce a single image; and
an interchangeable lens which is removably mounted on the image pick-up apparatus;
wherein the first plurality of images include a first image and a second image having an image magnification different from an image magnification of the first image,
wherein the image producer produces a third image from the second image, the third image having an image magnification identical to the image magnification of the first image, and
wherein the second plurality of images include the first image and the third image.

6. The image pick-up apparatus according to claim 1, wherein the information producer produces the second plurality of images such that the image magnification of each of the first plurality of images is matched to that of the image with the highest image magnification.

7. The image pick-up system according to claim 5, wherein the information producer produces the second plurality of images such that the image magnification of each of the first plurality of images is matched to that of the image with the highest image magnification.

* * * * *